United States Patent
Takahashi et al.

(10) Patent No.: US 11,516,453 B2
(45) Date of Patent: Nov. 29, 2022

(54) INFORMATION PROCESSING APPARATUS, INFORMATION PROCESSING METHOD, AND PROGRAM FOR POINT CLOUD SAMPLE PROCESSING

(71) Applicant: Sony Corporation, Tokyo (JP)

(72) Inventors: Ryohei Takahashi, Tokyo (JP);
Mitsuhiro Hirabayashi, Tokyo (JP);
Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/734,559

(22) PCT Filed: May 29, 2019

(86) PCT No.: PCT/JP2019/021191
§ 371 (c)(1),
(2) Date: Dec. 3, 2020

(87) PCT Pub. No.: WO2020/008758
PCT Pub. Date: Jan. 9, 2020

(65) Prior Publication Data
US 2021/0235056 A1    Jul. 29, 2021

(30) Foreign Application Priority Data
Jul. 6, 2018  (JP) .............................. JP2018-129332

(51) Int. Cl.
*H04N 13/178*    (2018.01)
*H04N 19/597*    (2014.01)
(Continued)

(52) U.S. Cl.
CPC ......... *H04N 13/178* (2018.05); *H04N 13/275* (2018.05); *H04N 19/597* (2014.11); *H04N 21/816* (2013.01); *H04N 13/189* (2018.05)

(58) Field of Classification Search
None
See application file for complete search history.

(56) References Cited

U.S. PATENT DOCUMENTS

| | | | | |
|---|---|---|---|---|
| 2011/0164113 A1* | 7/2011 | Pahalawatta | ......... | H04N 13/161 348/43 |
| 2011/0310235 A1* | 12/2011 | Sasaki | ................. | H04N 13/189 348/54 |

(Continued)

FOREIGN PATENT DOCUMENTS

| | | |
|---|---|---|
| JP | 2011-142586 A | 7/2011 |
| WO | WO-2013030458 A1 | 3/2013 |

(Continued)

OTHER PUBLICATIONS

International Search Report and Written Opinion dated Jul. 30, 2019, received for PCT Application No. PCT/JP2019/021191, Filed on May 29, 2019, 12 pages including English Translation.

(Continued)

*Primary Examiner* — Stefan Gadomski
(74) *Attorney, Agent, or Firm* — Xsensus LLP

(57) ABSTRACT

The present disclosure relates to an information processing apparatus and an information processing method that enable processing to be performed simply, and a program. By converting a point cloud representing a three-dimensional structure into two dimensions, a geometry image and a texture image, and three-dimensional information metadata required for constructing the geometry image and the texture image in three dimensions are obtained. Then, one PC sample included in a Point Cloud displayed at a specific time is generated by storing the geometry image, the texture image, and the three-dimensional information metadata in accordance with a playback order required at a time of reproducing and playing back the geometry image and the texture image in three dimensions on the basis of the (Continued)

| header () { | Descriptor | Comments |
|---|---|---|
| size_of_sample | u(32) | SIZE OF geometry OR texture sample |
| type | u(8) | TYPE OF sample. 0:geometry, 1:texture |
| layer_id | u(8) | layer IDENTIFIER OF sample |
| } | | | three-dimensional information metadata. It is possible to apply to a data generation device that generates data for distribution of a Point Cloud.

13 Claims, 57 Drawing Sheets

(51) Int. Cl.
*H04N 21/81* (2011.01)
*H04N 13/275* (2018.01)
*H04N 13/189* (2018.01)

(56) References Cited

U.S. PATENT DOCUMENTS

| | | | |
|---|---|---|---|
| 2012/0120200 A1* | 5/2012 | Newton | H04N 19/597 348/E13.001 |
| 2012/0288257 A1 | 11/2012 | Katsumata et al. | |
| 2015/0208056 A1* | 7/2015 | Park | H04N 13/106 348/43 |
| 2016/0088281 A1* | 3/2016 | Newton | H04N 19/17 348/43 |
| 2017/0237965 A1* | 8/2017 | Wang | H04N 13/178 348/42 |
| 2018/0164593 A1* | 6/2018 | Van Der Auwera | G06F 3/013 |
| 2018/0268570 A1 | 9/2018 | Budagavi et al. | |
| 2018/0277164 A1* | 9/2018 | Wang | H04N 21/4348 |
| 2018/0278956 A1 | 9/2018 | Toma et al. | |
| 2018/0302647 A1 | 10/2018 | Tanaka | |
| 2018/0376125 A1* | 12/2018 | Wang | H04N 13/156 |
| 2018/0376152 A1* | 12/2018 | Wang | H04N 19/33 |
| 2019/0304160 A1 | 10/2019 | Izumi | |
| 2019/0311471 A1* | 10/2019 | Kurabayashi | G06T 7/0002 |
| 2020/0107006 A1* | 4/2020 | Lee | H04N 19/103 |
| 2020/0120326 A1* | 4/2020 | Deshpande | H04N 21/816 |
| 2020/0175754 A1* | 6/2020 | Abe | G06T 17/05 |
| 2020/0288171 A1* | 9/2020 | Hannuksela | H04N 5/247 |

FOREIGN PATENT DOCUMENTS

| | | |
|---|---|---|
| WO | 2017/082076 A1 | 5/2017 |
| WO | 2017/104115 A1 | 6/2017 |
| WO | 2018/021069 A1 | 2/2018 |

OTHER PUBLICATIONS

Khaled Mammou, "PCC Test Model Category 2 v1", 3DG, ISO/IEC JTC1/SC29/WG11 N17348, Jan. 2018, Gwangju, Republic of Korea, 11 Pages.

Khaled Mammou, "First Working Draft for PCC Category 2", 3DG Subgroup, ISO/IEC JTC1/S29/WG11, MPEG 2012/N17374, Jan. 2018, Gwangju, Republic of Korea, 5 pages.

"First idea on Systems technologies for Point Cloud Coding", ISO/IEC JTC1/SC29/WG11 MPEG2018/w17675, Apr. 2018, San Diego, US., 6 pages.

Khaled Mammou, "PCC Test Model Category 2 vl", Jan. 2018; Gwangju, Republic of Korea,; ISO/IEC JTC1/SC29/WG11,No. N17348, pp. 1-11.

Ahmed Hamza, "Questions related to V-PCC File Format Design", Geneva, CH—Apr. 2019; ISO/IEC JTC1/SC29/WG11, No. N18415, pp. 1-6.

Imed Bouazizi et al.: "PCC High Level Bitstream Syntax Considerations", San Diego,US, ISO/IECJTC1/SC29/WG11, MPEG2018/m42671, Apr. 2018, pp. 1-4.

"Information technology—Coding of audio-visual objects—Part 12, ISO base media file format", 2014, International Standard, ISO/IEC 14496-12:2012(E), pp. 1-194.

Ryohei Takahashi et al., "V-PCC layer signaling in ISOBMFF", 126. MPEG Meeting; Mar. 2019, Geneva, CH, ISO/IEC JTC1/SC29/WG11 MPEG2019/M47361, pp. 1-7.

Sebastian Schwarz (Nokia) et al, "Removal of second layer coding for PCC TMC2",Feb. 2016, San Jose, CA, US, ISO/IEC JTC1/SC29/WG11 MPEG2016/,M42438, pp. 1-7.

\* cited by examiner

FIG. 7

| point_cloud_header ( ) { | Descriptor | Comments |
|---|---|---|
| size_of_pc_frame | u(32) | SIZE OF PC frame |
| number_of_layer | u(8) | NUMBER OF layers OF texture OR geometry INCLUDED IN ONE PC frame |
| frameWidth | u(16) | WIDTH OF geometry/texture IMAGE |
| frameHeight | u(16) | HEIGHT OF geometry/texture IMAGE |
| occupancyResolution | u(8) | RESOLUTION OF occupancy map |
| radiusToSmoothing | u(8) | NEIGHBORING POINT DETECTION RADIUS FOR SMOOTHING |
| neighborCountSmoothing | u(8) | MAXIMUM NUMBER OF NEIGHBORING POINTS USED FOR SMOOTHING |
| radius2BoundaryDetection | u(8) | BOUNDARY POINT DETECTION RADIUS |
| thresholdSmoothing | u(8) | SMOOTHING THRESHOLD VALUE |
| } | | |

FIG. 8

| header() { | Descriptor | Comments |
|---|---|---|
| size_of_sample | u(32) | SIZE of geometry OR texture sample |
| type | u(8) | TYPE OF sample. 0: geometry, 1: texture |
| layer_id | u(8) | layer IDENTIFIER OF sample |
| } | | |

FIG. 9

| group_of_frames_header () { | Descriptor | Comments |
|---|---|---|
| groupOfFramesSize | u(8) | NUMBER OF frames IN group of frames |
| frameWidth | u(16) | WIDTH OF geometry/texture IMAGE |
| frameHeight | u(16) | HEIGHT OF geometry/texture IMAGE |
| occupancyResolution | u(8) | RESOLUTION OF occupancy map |
| radiusToSmoothing | u(8) | NEIGHBORING POINT DETECTION RADIUS FOR SMOOTHING |
| neighborCountSmoothing | u(8) | MAXIMUM NUMBER OF NEIGHBORING POINTS USED FOR SMOOTHING |
| radius2BoundaryDetection | u(8) | BOUNDARY POINT DETECTION RADIUS |
| thresholdSmoothing | u(8) | SMOOTHING THRESHOLD VALUE |
| } | | |

FIG. 11

| VALUE | MEANING |
|---|---|
| 0 | subsample IS geometry subsample |
| 1 | subsample IS texture subsample |

FIG. 12

```
aligned(8) class PCSampleEntry extends VisualSampleEntry('pcbs', 0, 0)
{
    PCHeaderBox();
    LayerCompositionBox();
    SubSampleEntryBox();
}
```

FIG. 13

```
aligned(8) class PCHeaderBox extends FullBox('pchd', 0, 0)
{
    unsigned int(32) size_of_pc_frame;
    unsigned int(8)  number_of_layer;
    unsigned int(16) frameWidth;
    unsigned int(16) frameHeight;
    unsigned int(8)  occupancyResolution;
    unsigned int(8)  radiusToSmoothing;
    unsigned int(8)  neighborCountSmoothing;
    unsigned int(8)  radius2BoundaryDetection;
    unsigned int(8)  thresholdSmoothing;
}
```

FIG. 14

```
aligned(8) class SubSampleEntryBox extends FullBox('sube', 0, 0)
{
    unsigned int(8) num_of_component;
    for(i=0; i<num_of_component; i++){
        unsigned int(8) type; // 0: geometry, 1: texture
        SampleEntry(); // HEVC, AVC, ...
    }
}
```

FIG. 15

```
aligned(8) class LayerCompositionBox extends FullBox('lcmp', 0, 0)
{
    unsigned int(8) num_layer_composed;
    unsigned int(8) num_of_component;
}
```

*FIG. 21*

| moov | trak | | | | | | | | | | | | |
|---|---|---|---|---|---|---|---|---|---|---|---|---|---|
| | | | | | | | | | | | | | MovieBox |
| | | tkhd | | | | | | | | | | | TrackBox |
| | | | | | | | | | | | | | TrackHeaderBox |
| | | | mdia | | | | | | | | | | MediaBox |
| | | | | minf | | | | | | | | | MediaInformationBox |
| | | | | | stbl | | | | | | | | SampleTableBox |
| | | | | | | stsd | | | | | | | SampleDescriptionBox |
| | | | | | | | pcbs | | | | | | PCSampleEntry |
| | | | | | | | | pchd | | | | | PCHeaderBox |
| | | | | | | | | | sube | | | | SubSampleEntryBox |
| | | | | | | | | | | lcmp | | | LayerCompositionBox |
| moof | | | | | | | | | | | | | MovieFragmentBox |
| | traf | | | | | | | | | | | | TrackFragmentBox |
| | | subs | | | | | | | | | | | SubSampleInformationBox |

| point cloud frame packing SEI | |
|---|---|
| point_cloud_frame_packing(payloadSize) { | Descriptor |
| packing_arrangement | u(2) |
| frame0_is_geometry | u(1) |
| reserved_zero_5bits | u(5) |
| } | |

FIG. 26

| FIELD NAME | EXPLANATION |
|---|---|
| packing_arrangement | 0:side by side, 1:top & bottom, others:reserved |
| frame0_is_geometry | 0:frame0 IS geometry, 1:frame0 IS texture |

FIG. 29

```
aligned(8) class PCPackingInfoBox extends
FullBox('pinf', 0, 0)
{
    unsigned int(5) reserved = 0;
    unsigned int(2) packing_arrangement;
    unsigned int(1) frame0_is_geometry;
}
```

FIG. 34

| | | | | | | | | | | | | | | |
|---|---|---|---|---|---|---|---|---|---|---|---|---|---|---|
| moov | | | | | | | | | | | | | | MovieBox |
| | trak | | | | | | | | | | | | | TrackBox |
| | | tkhd | | | | | | | | | | | | TrackHeaderBox |
| | | mdia | | | | | | | | | | | | MediaBox |
| | | | minf | | | | | | | | | | | MediaInformationBox |
| | | | | stbl | | | | | | | | | | SampleTableBox |
| | | | | | stsd | | | | | | | | | SampleDescriptionBox |
| | | | | | | resv | | | | | | | | RestrictedSampleEntry |
| | | | | | | | pchd | | | | | | | PCHeaderBox |
| | | | | | | | lcmp | | | | | | | LayerCompositionBox |
| | | | | | | | rinf | | | | | | | RestrictedSchemeInformationBox |
| | | | | | | | | frma | | | | | | OriginalFormatBox |
| | | | | | | | | schi | | | | | | SchemeInformationBox |
| | | | | | | | | | pinf | | | | | PCPackingInfoBox |
| moof | | | | | | | | | | | | | | MovieFragmentBox |
| | traf | | | | | | | | | | | | | TrackFragmentBox |
| | | subs | | | | | | | | | | | | SubSampleInformationBox |

FIG. 35

```
aligned(8) class PCPackingInfoBox extends FullBox('pinf', 0, 0)
{
    unsigned int(8) component_num;
    unsigned int(8) layer_num;
    for(i=0 ; i<component_num*layer_num; i++) {
        unsigned int(8) component_type;
        unsigned int(8) layer_id;
        unsigned int(16) left[i];
        unsigned int(16) top[i];
        unsigned int(16) width[i];
        unsigned int(16) height[i];
    }
}
```

FIG. 38

```
class GOFEntry extends VisualSampleGroupEntry ('gofg') {
    unsigned int(8) groupOfFrameSize;
    unsigned int(16) frameWidth;
    unsigned int(16) frameHeight;
    unsigned int(8) occupancyResolution;
    unsigned int(8) radiusToSmoothing;
    unsigned int(8) neighborCountSmoothing;
    unsigned int(8) radius2BoundaryDetection;
    unsigned int(8) thresholdSmoothing;
}
```

FIG. 39

```
class PCFrameEntry extends VisualSampleGroupEntry ('pcfg'){
    unsigned int(32) size_of_pc_frame;
    unsigned int(8) number_of_component;
}
```

FIG. 40

```
class ComponentGroupEntry extends VisualSampleGroupEntry ('pcfg') {
    unsigned int(8) type;
    unsigned int(8) number_of_layer;
}
```

FIG. 42

| | | | | | | | | | | | | | |
|---|---|---|---|---|---|---|---|---|---|---|---|---|---|
| moov | | | | | | | | | | | | | MovieBox |
| | trak | | | | | | | | | | | | TrackBox |
| | | tkhd | | | | | | | | | | | TrackHeaderBox |
| | | mdia | | | | | | | | | | | MediaBox |
| | | | minf | | | | | | | | | | MediaInformationBox |
| | | | | stbl | | | | | | | | | SampleTableBox |
| | | | | | stsd | | | | | | | | SampleDescriptionBox |
| | | | | | | resv | | | | | | | SampleDescriptionEntry |
| | | | | | | | | | | | | | RestrictedSampleEntry |
| | | | | | | | rinf | | | | | | RestrictedSchemeInformationBox |
| | | | | | | | | frma | | | | | OriginalFormatBox |
| | | | | | | | | schi | | | | | SchemeInformationBox |
| | | | | | | | | | pchd | | | | PCHeaderBox |
| | | | | | | | | | lcmp | | | | LayerCompositionBox |
| moof | | | | | | | | | | | | | MovieFragmentBox |
| | traf | | | | | | | | | | | | TrackFragmentBox |
| | | sbgp | | | | | | | | | | | SampleToGroupBox |
| | | sgpd | | | | | | | | | | | SampleGroupDescriptionBox |

FIG. 45

```
aligned(8) class PCMultiStreamBox extends FullBox('pcms', 0, 0)
{
    unsigned int(7) reserved = 0;
    unsigned int(1) isGeometryStream;
    if(isGeometryStream) {
        unsigned int(32) num_texture_stream
        for(i=0; i<num_texture_stream)
            unsigned int(32) texture_track_id;
    }
}
```

FIG. 46

```
aligned(8) class PCMultiStreamBox extends
FullBox('pcms', 0, 0)
{
    unsigned int(7) reserved = 0;
    unsigned int(1) isGeometryStream;
    if(isGeometryStream) {
        unsigned int(32) texture_track_group_id;
    }
}
```

FIG. 47

```
aligned(8) class PCTextureTrackGroup extends TrackGroupTypeBox('pctg')
{
    // track_group_id is inherited from TrackGroupTypeBox
}
```

FIG. 48

```
aligned(8) class PCMultiStreamBox extends FullBox('pcms', 0, 0)
{
    unsigned int(7) reserved = 0;
    unsigned int(1) isGeometryStream;
    if(isGeometryStream) {
        unsigned int(32) num_texture_stream
        for(i=0; i<num_texture_stream) {
            unsigned int(7) reserved = 0;
            unsigned int(1) isInGeometryStream;
            if(isInGeometryStream)
                unsigned int(32) texture_track_id;
}
```

FIG. 50

```
aligned(8) class PCStreamGroupBox extends TrackGroupTypeBox('pcgp')
{
    // track_group_id is inherited from TrackGroupTypeBox
    unsigned int(7) reserved = 0;
    unsigned int(1) isGeometry;
}
```

FIG. 51

| | | | | | | | | | | | | | | | | |
|---|---|---|---|---|---|---|---|---|---|---|---|---|---|---|---|---|
| moov | | | | | | | | | | | | | | | | MovieBox |
| | trak | | | | | | | | | | | | | | | TrackBox |
| | | tkhd | | | | | | | | | | | | | | TrackHeaderBox |
| | | mdia | | | | | | | | | | | | | | MediaBox |
| | | | minf | | | | | | | | | | | | | MediaInformationBox |
| | | | | stbl | | | | | | | | | | | | SampleTableBox |
| | | | | | stsd | | | | | | | | | | | SampleDescriptionBox |
| | | | | | | resv | | | | | | | | | | RestrictedSampleEntry |
| | | | | | | | rinf | | | | | | | | | RestrictedSchemeInformationBox |
| | | | | | | | | frma | | | | | | | | OriginalFormatBox |
| | | | | | | | | schi | | | | | | | | SchemeInformationBox |
| | | | | | | | | | pchd | | | | | | | PCHeaderBox |
| | | | | | | | | | lcmp | | | | | | | LayerCompositionBox |
| moof | | | | | | | | | | | | | | | | MovieFragmentBox |
| | traf | | | | | | | | | | | | | | | TrackFragmentBox |
| | | sbgp | | | | | | | | | | | | | | SampleToGroupBox |
| | | sgpd | | | | | | | | | | | | | | SampleGroupDescriptionBox |

FIG. 52

```
<MPD>
<Period>
<AdaptationSet>
<Representation id="geometry" >
<EssentialProperty schemeIdUri="urn:mpeg:mpegI:pointcloud" isGeometry="1"/>
<BaseURL> geometry.mp4</BaseURL>
</Representation>
</AdaptationSet>
<AdaptationSet>
<Representation id="texture1" dependencyId="geometry" width="3840" height="2160" >
<EssentialProperty schemeIdUri="urn:mpeg:mpegI:pointcloud" isGeometry="0"/>
<BaseURL> texture1.mp4</BaseURL>
</Representation>
<Representation id="texture2" dependencyId="geometry" width="1920" height="1080" >
<EssentialProperty schemeIdUri="urn:mpeg:mpegI:pointcloud" isGeometry="0"/>
<BaseURL> texture2.mp4</BaseURL>
</Representation>
</AdaptationSet>
</MPD>
```

FIG. 53

```
<MPD>
 <Period>
  <AdaptationSet>
   <Representation id="geometry" associationId="texture1 texture2" associationType="ptex ptex" bandwidth="5000000">
    <EssentialProperty schemeIdUri="urn:mpeg:mpegI:pointcloud" isGeometry="1"/>
    <BaseURL>geometry.mp4</BaseURL>
   </Representation>
  </AdaptationSet>
  <AdaptationSet>
   <Representation id="texture1" dependencyId="geometry" bandwidth="30000000">
    <EssentialProperty schemeIdUri="urn:mpeg:mpegI:pointcloud" isGeometry="0"/>
    <BaseURL>texture1.mp4</BaseURL>
   </Representation>
   <Representation id="texture2" dependencyId="geometry" bandwidth="15000000">
    <EssentialProperty schemeIdUri="urn:mpeg:mpegI:pointcloud" isGeometry="0"/>
    <BaseURL>texture2.mp4</BaseURL>
   </Representation>
  </AdaptationSet>
 </Period>
</MPD>
```

INFORMATION PROCESSING APPARATUS, INFORMATION PROCESSING METHOD, AND PROGRAM FOR POINT CLOUD SAMPLE PROCESSING

CROSS-REFERENCE TO RELATED APPLICATIONS

The present application is based on PCT filing PCT/JP2019/021191, filed May 29, 2019, which claims priority to JP 2018-129332, filed Jul. 6, 2018, the entire contents of each are incorporated herein by reference.

TECHNICAL FIELD

The present disclosure relates to an information processing apparatus, an information processing method, and a program. In particular, the present disclosure relates to an information processing apparatus and an information processing method that enable processing to be performed simply, and a program.

BACKGROUND ART

Conventionally, as disclosed in Non Patent Document 1, there is defined a compression method of a Point Cloud, which is a set of points having position information and attribute information (especially color information) at the same time in a three-dimensional space.

Furthermore, Non Patent Document 2 discloses, as one of compression methods of the Point Cloud, a method of dividing the Point Cloud into multiple regions (hereinafter, referred to as segmentation), performing plane projection for each region to generate a texture image and a geometry image, and then encoding these with a moving image codec. Here, the geometry image is an image including depth information of a point group included in the Point Cloud.

Such a compression method of a Point Cloud is called point cloud coding test model category 2 (PCC TMC2). Furthermore, a structure of a Point Cloud stream (hereinafter, also referred to as a PC stream) generated by PCC TMC2 is disclosed in Non Patent Document 3.

Then, a use case in which such a PC stream is distributed through an over IP network is expected. Therefore, in order to suppress an impact on an existing distribution platform and aim for early service realization, as disclosed in Non Patent Document 4, examination of a distribution technology using existing framework ISO base media file format/dynamic adaptive streaming over HTTP (ISOBMFF/DASH) has been started in a moving picture experts group (MPEG).

Furthermore, Patent Document 1 discloses an image processing device that packs and records three-dimensional image data by a side-by-side method, a top-and-bottom method, or the like.

CITATION LIST

Patent Document

Patent Document 1: Japanese Patent Application Laid-Open No. 2011-142586

Non Patent Document

Non Patent Document 1: MPEG-I Part 5 Point Cloud Compression (ISO/IEC 23090-5)

Non Patent Document 2: w17348, PCC Test Model Category 2 v1, January 2018, Gwangju, Korea Non Patent Document 3: w17374, First Working Draft for PCC Category 2, January 2018, Gwangju, Korea Non Patent Document 4: w17675, First idea on Systems technologies for Point Cloud Coding, April 2018, San Diego, US

SUMMARY OF THE INVENTION

Problems to be Solved by the Invention

Meanwhile, in a structure of a PC stream as disclosed in Non Patent Document 3 described above, a large amount of random access will occur during normal playback, and processing on a client side that plays back the Point Cloud becomes complicated, which causes a concern of delayed processing and increased processing costs.

The present disclosure has been made in view of such a situation, and is intended to enable processing to be performed simply.

Solutions to Problems

In an information processing apparatus according to one aspect of the present disclosure, by converting 3D data representing a three-dimensional structure into two dimensions, there are obtained at least a first image and a second image, and three-dimensional information metadata required for constructing the first image and the second image in three dimensions. The information processing apparatus includes a file generation unit configured to generate a file of one unit forming the 3D data displayed at a specific time, by storing the first image, the second image, and the three-dimensional information metadata in accordance with a playback order required at a time of reproducing and playing back the first image and the second image in three dimensions on the basis of the three-dimensional information metadata.

In an information processing method or a program of one aspect of the present disclosure, by converting 3D data representing a three-dimensional structure into two dimensions, there are obtained at least a first image and a second image, and three-dimensional information metadata required for constructing the first image and the second image in three dimensions. The information processing method or the program includes: generating a file of one unit forming the 3D data displayed at a specific time, by storing the first image, the second image, and the three-dimensional information metadata in accordance with a playback order required at a time of reproducing and playing back the first image and the second image in three dimensions on the basis of the three-dimensional information metadata.

In one aspect of the present disclosure, by converting 3D data representing a three-dimensional structure into two dimensions, there are obtained at least a first image and a second image, and three-dimensional information metadata required for constructing the first image and the second image in three dimensions. Further, a file of one unit forming the 3D data displayed at a specific time is generated by storing the first image, the second image, and the three-dimensional information metadata in accordance with a playback order required at a time of reproducing and playing back the first image and the second image in three dimensions on the basis of the three-dimensional information metadata.

Effects of the Invention

According to one aspect of the present disclosure, processing can be performed simply.

Note that the effects described herein are not necessarily limited, and any of the effects described in the present disclosure is possible.

BRIEF DESCRIPTION OF DRAWINGS

FIG. 7 is a view showing an example of information stored in a PC header.

FIG. 8 is a view showing an example of information stored in a header.

FIG. 9 is a view showing an example of information stored in a GOF header.

FIG. 11 is a view showing a definition of codec_specific_parameters.

FIG. 12 is a view showing a structure of PCSampleEntry.

FIG. 13 is a view showing an example of PCHeaderBox.

FIG. 14 is a view showing an example of SubSampleEntryBox.

FIG. 15 is a view showing an example of LayerCompositionBox.

FIG. 21 is a view showing an example of an ISOBMFF structure in a first storage method.

FIG. 26 is a view for explaining definitions of packing_arrangement and frame0_is_geometry.

FIG. 29 is a view showing an example of PCPackingInfoBox.

FIG. 34 is a view showing a modified example of PCPackingInfoBox.

FIG. 35 is a view showing an example of an ISOBMFF structure in a second storage method.

FIG. 38 is a view showing a definition of GOFEntry( ).

FIG. 39 is a view showing a definition of PCFrameEntry( ).

FIG. 40 is a view showing a definition of ComponentGroupEntry( ).

FIG. 42 is a view showing an example of an ISOBMFF structure in a third storage method.

FIG. 45 is a view showing an example of syntax of PCMultiStreamBox.

FIG. 46 is a view showing a modified example of PCMultiStreamBox.

FIG. 47 is a view showing an example of syntax of PCTextureTrackGroup.

FIG. 48 is a view showing a modified example of PCMultiStreamBox.

FIG. 50 is a view showing an example of newly defined PCStreamGroupBox.

FIG. 51 is a view showing an example of an ISOBMFF structure in a fourth storage method.

FIG. 52 is a view for explaining DASH signaling.

FIG. 53 is a view for explaining DASH signaling.

MODE FOR CARRYING OUT THE INVENTION

Hereinafter, a specific embodiment to which the present technology is applied will be described in detail with reference to the drawings.

<Conventional Encoding Method>

Before describing an encoding method to which the present technology is applied, a conventional encoding method will be described with reference to FIGS. 1 to 4.

Figure 1:
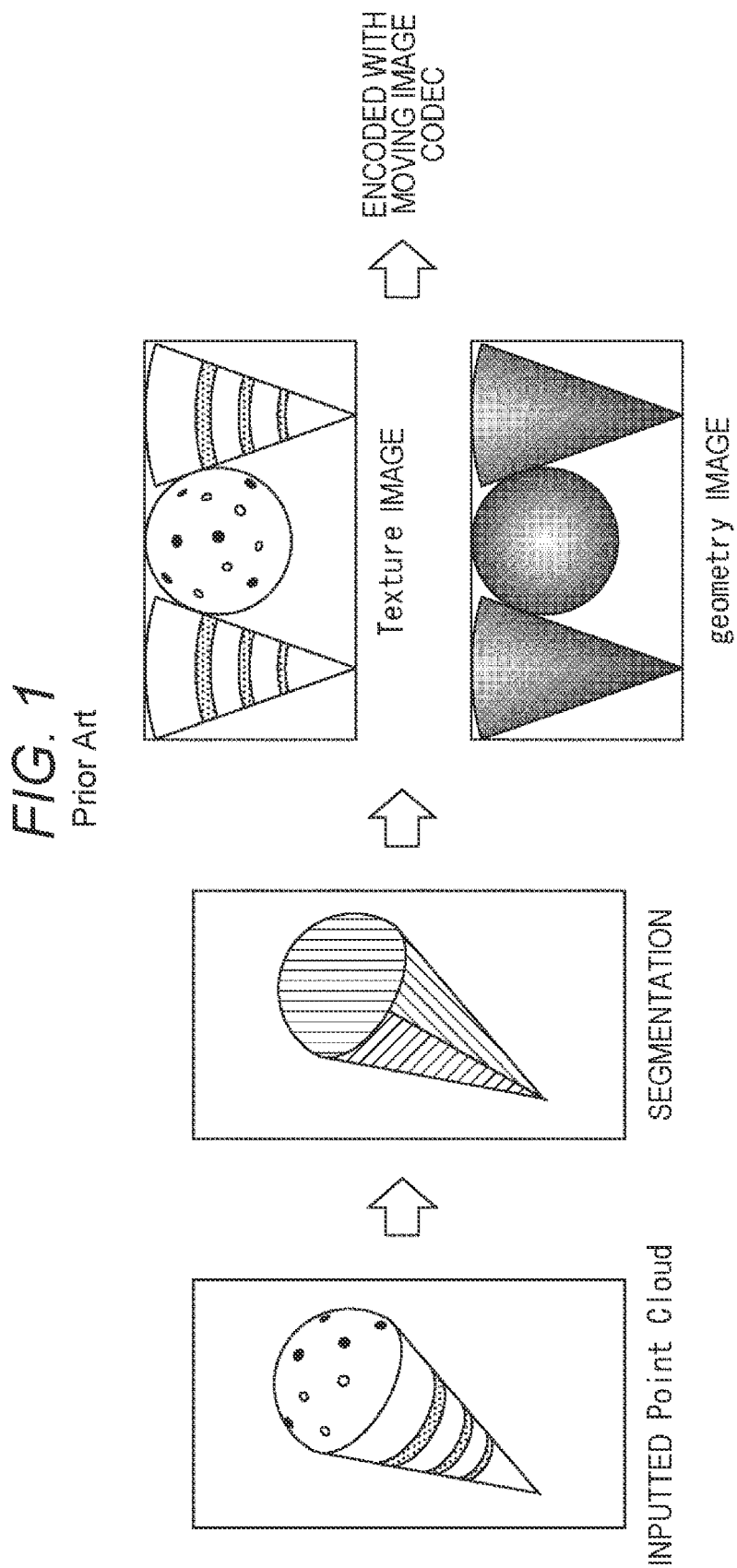
FIG. 1 is a view for explaining a compression method of a Point Cloud.

FIG. 1 is a view for briefly explaining a Point Cloud compression method disclosed in Non Patent Document 2 described above.

As shown in FIG. 1, first, a Point Cloud representing a three-dimensional structure is inputted, and the Point Cloud is segmented. In the example shown in FIG. 1, a Point Cloud representing a three-dimensional structure that combines a hemispherical shape and a conical shape is inputted, and segmented into three regions in which a hemispherical shape is one region and a cone shape is divided into two regions. Next, a plane projection is performed for every region, to generate a texture image including color information representing an appearance of a surface of each region, and a geometry image including position information representing a depth to the surface of each region. Then, the texture image and the geometry image are encoded by a moving image codec such as, for example, advanced video coding (AVC) or high efficiency video coding (HEVC).

Figure 2:
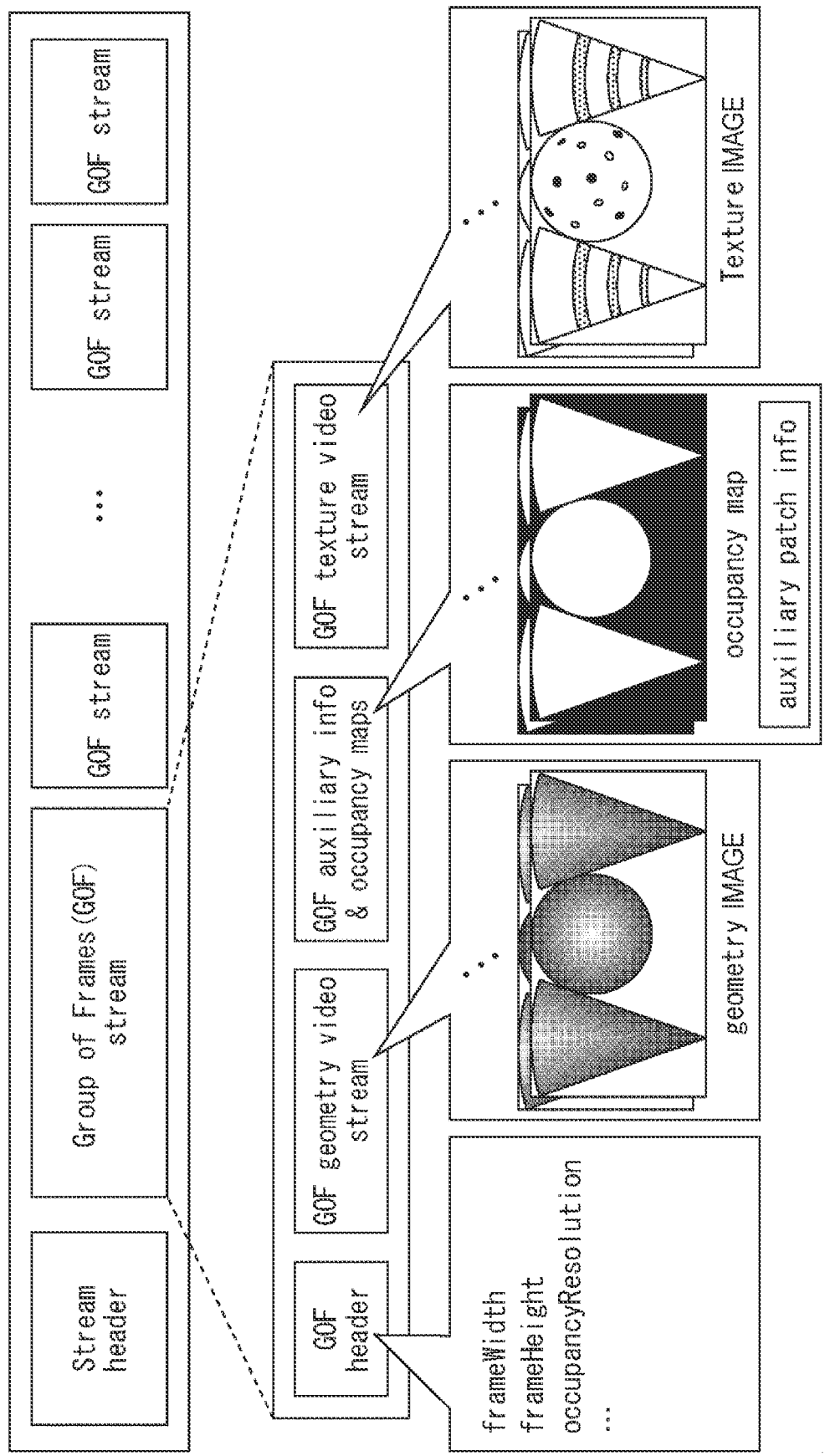
FIG. 2 is a view showing a structure of a PC stream.

FIG. 2 is a view showing a structure of a PC stream.

As shown in FIG. 2, the PC stream includes one stream, in which constituent elements of multiple Point Cloud frames that are displayed continuously in a specific time width are grouped together in a unit called group of frames (GOF). Here, the Point Cloud frame (hereinafter, also referred to as a PC frame) is a Point Cloud displayed at the same time.

Then, the GOF includes a texture video stream in which a texture image is encoded, a geometry video stream in which a geometry image is encoded, and three-dimensional information metadata (auxiliary patch info and an occupancy map) to be used for 2D3D conversion. Here, the geometry video stream and the texture video stream have multiple frames of (frame rate of PC stream)×(GOF time width)×N (number of layers). Then, there is a characteristic in which each of the geometry video stream and the texture video stream has N pieces of frame for one frame of the PC stream. This is for representing a layer structure in a thickness direction of the Point Cloud. That is, it means that each PC frame includes N pieces of frame.

For example, a client decodes the geometry video stream and the texture video stream in the PC stream, and uses the occupancy map to generate a geometry patch and a texture patch. Thereafter, the client uses the auxiliary patch info to generate a Point Cloud with no color from the geometry patch first, and then colors the Point Cloud with the texture patch.

Figure 3:
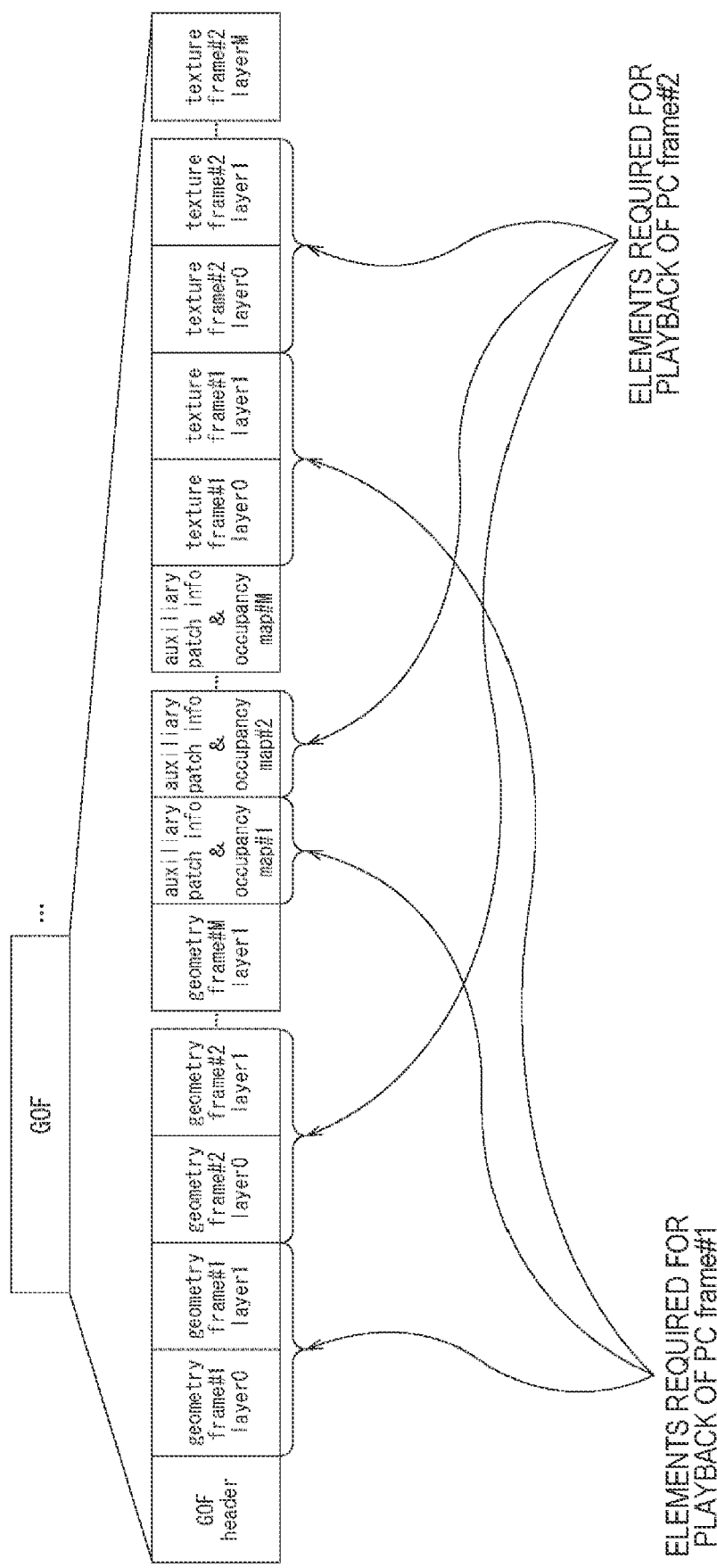
FIG. 3 is a view showing a structure of a GOF.

FIG. 3 shows a GOF structure in a conventional PC stream, and shows an example in which the number of layers is 2.

As shown in FIG. 3, in the conventional structure, PC frames displayed within a specific time width are not continuously arranged in the stream. That is, the conventional PC stream has a structure in which elements required for playback of PC frame #1 and elements required for playback of PC frame #2 are arranged before and after each other. Therefore, for example, in a case of accessing geometry frame #1 layer0, geometry frame #1 layer1, auxiliary patch info & occupancy map #1, texture frame #1 layer0, and texture frame #1 layer1, which are elements required for playback of PC frame #1, and thereafter, accessing elements required for playback of PC frame #2, a process of starting access from geometry frame #2 layer0 arranged at a position before texture frame #1 layer1 occurs. Therefore, as described above, a large amount of random access occurs during normal playback.

In this regard, the PC stream structure shown in FIG. 3 is different from a stream configuration of an existing video codec, and is not suitable for storage in ISOBMFF and distribution with over IP (Internet Protocol).

For example, Non Patent Document 4 described above discloses a methodology in which a geometry video stream and a texture video stream are treated independently for every stream and stored in individual tracks. However, even with this methodology, a large amount of random access will occur during normal playback.

Figure 4:
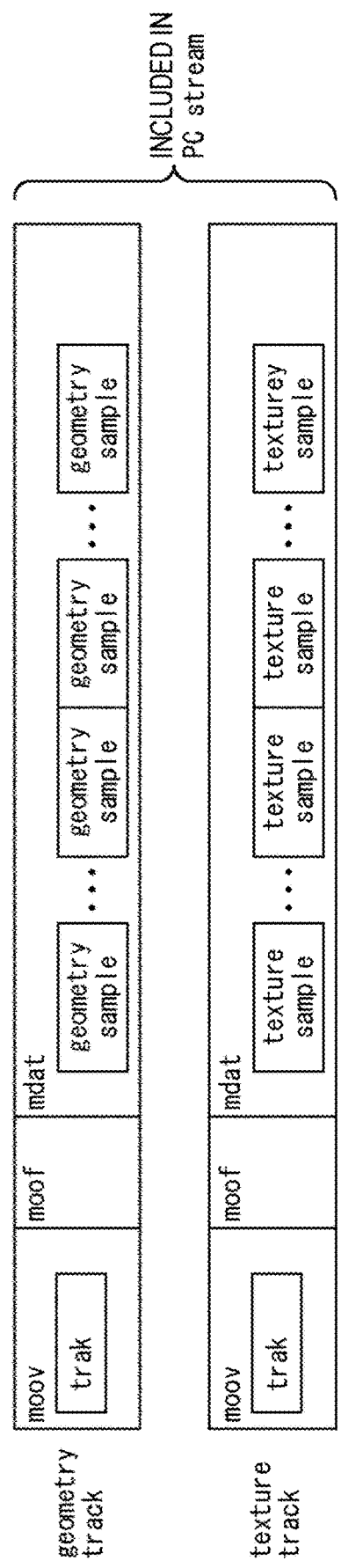
FIG. 4 is a view showing a structure of a geometry video stream and a texture video stream.

Furthermore, as shown in FIG. 4, the methodology disclosed in this Non Patent document 4 is useful for a use case of, when acquiring a geometry video stream and a texture video stream, selecting a bitrate of each stream in accordance with a network bandwidth and reconfiguring PCC having optimal quality. This is because a burden of arranging a large number of single streams (a combination of a geometry video stream and a texture video stream having different bitrates) on a server is eliminated.

Therefore, an embodiment described below makes it possible to perform processing simply in a client in realizing such a use case, by newly defining an association method of a geometry video stream and a texture video stream included in a PC stream.

<PC Sample Definition for ISOBMFF Storage>

A Point Cloud sample (hereinafter, referred to as a PC sample) to be newly defined for ISOBMFF storage will be described with reference to FIG. 5.

Figure 5:
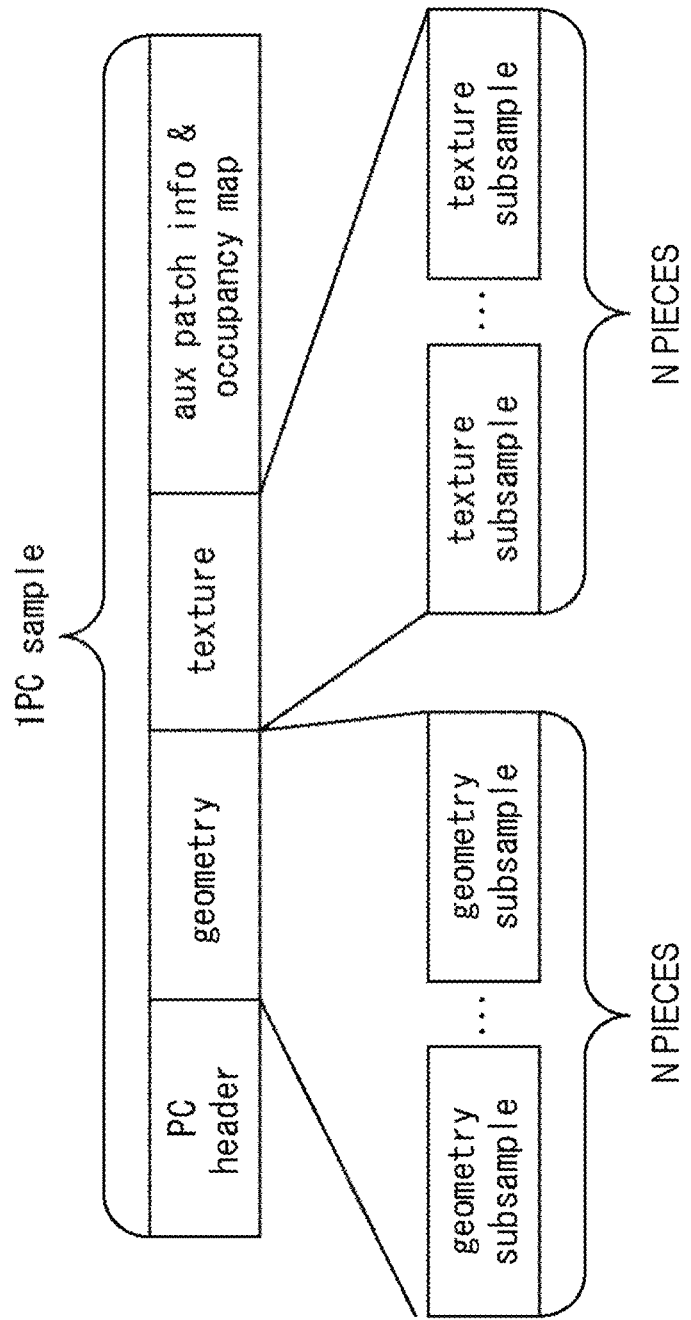
FIG. 5 is a view showing a structure of a PC sample to be newly defined.

FIG. 5 is a view showing a structure of a PC sample to be newly defined.

First, a unit that forms a Point Cloud displayed at the same time is called one PC frame, and it is defined that one PC frame includes one PC sample. Then, in accordance with a playback order required at a time of reproducing and playing back a geometry image and a texture image in three dimensions on the basis of three-dimensional information metadata, the geometry image, the texture image, and the three-dimensional information metadata are stored in one track of ISOBMFF. By defining in this way, a client can form the Point Cloud displayed at the same time by decoding one PC sample. Therefore, the client can avoid an occurrence of a large amount of random access during normal playback as described above, and can perform processing simply. Therefore, for example, delayed processing and increased processing costs can be avoided.

The PC stream defined in this way includes a series of multiple PC samples.

As shown in FIG. 5, one PC sample includes multiple components and three-dimensional information metadata. Here, the component includes a texture image and a geometry image. Furthermore, the three-dimensional information metadata includes auxiliary patch info and an occupancy map, and a PC header.

Furthermore, one component includes multiple subsamples. That is, one component includes N pieces (layers) of geometry subsample and N pieces (layers) of texture subsample.

Then, the geometry subsamples and the texture subsamples are individually encoded by a moving image codec. Here, the subsample is a unit that forms one picture of the geometry video stream and the texture video stream.

Furthermore, the PC header has information indicating a layer structure of the component. Furthermore, the occupancy map has patch position information in a picture of the component, and the auxiliary patch info has 2D3D conversion information for attaching a patch to a 3D object.

Note that GOF information is contained in the PC header, but a GOF header may be individually signaled in the PC sample. Furthermore, the three-dimensional information metadata such as the PC header, the auxiliary patch info, and the occupancy map may be used as a subsample.

<First Storage Method>

With reference to FIGS. 6 to 19, a first storage method, which is a method of storing a PC stream in one track of ISOBMFF, will be described.

With reference to FIGS. 6 to 9, elementary stream signaling will be described.

Figure 6:
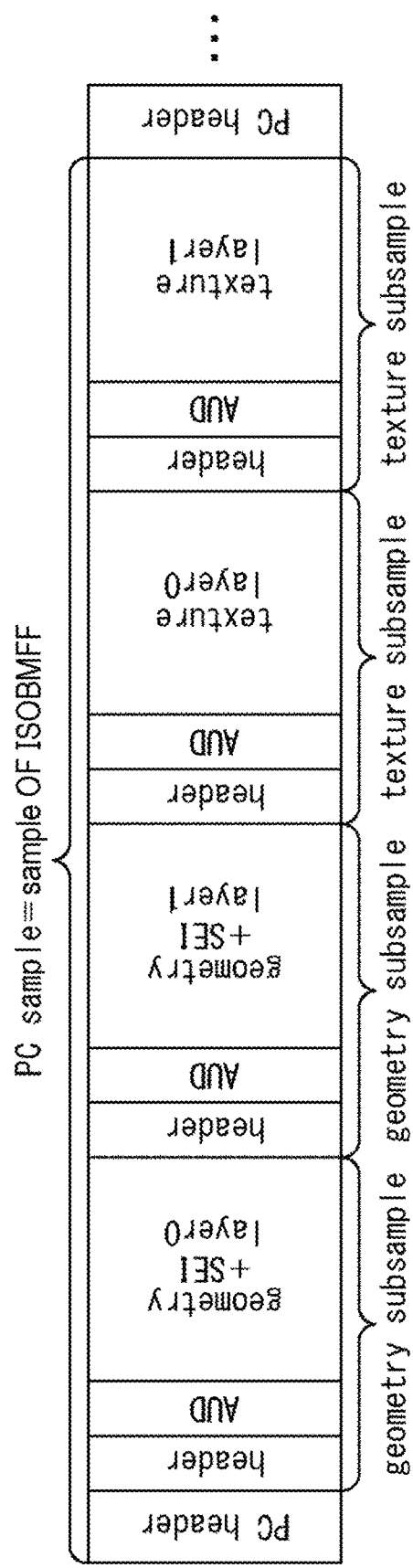
FIG. 6 is a view showing an example of a PC sample.

FIG. 6 shows an example of a PC sample (that is, a sample of ISOBMFF) in a case where the number of layers is 2 and a moving image codec used for encoding is AVC or HEVC. Here, an access unit delimiter (AUD) shown in FIG. 6 is a network abstraction layer (NAL) unit signaled in an access unit boundary of AVC or HEVC.

The PC sample shown in FIG. 6 has a configuration in which a geometry subsample of layer0, a geometry subsample of layer1, a texture subsample of layer0, and a texture subsample of layer1 are continuously arranged after the PC header.

FIG. 7 shows an example of information stored in the PC header of FIG. 6.

As shown in FIG. 7, the PC header stores, for example, information (size_of_pc_frame) indicating a size of the PC sample, and information (number_of_layer) indicating the number of layers of the texture image or the geometry image included in one PC frame. Furthermore, the PC header stores information (frameWidth) indicating a width of the geometry image or the texture image, information (frameHeight) indicating a height of the geometry image or the texture image, and information (occupancyResolution) indicating a resolution of the occupancy map. Moreover, the PC header stores information (radiusToSmoothing) indicating a radius to detect a neighboring point for smoothing, information (neighborCountSmoothing) indicating a maximum number of neighboring points used for smoothing, information (radius2BoundaryDetection) indicating a radius to detect a boundary point, and information (thresholdSmoothing) indicating a smoothing threshold value.

FIG. 8 shows an example of information stored in a header of FIG. 6.

As shown in FIG. 8, the header stores information (size_of_sample) indicating a size of a subsample of the texture image or the geometry image, information (type) indicating a type of the subsample, and a layer identifier (layer_id) of the subsample. For example, in a case where the information indicating the type of subsample is 0, it is indicated that the subsample is the geometry image. In a case where the information indicating the type of the subsample is 1, it is indicated that the subsample is the texture image.

Furthermore, an occupancy map and auxiliary patch info are contained as supplemental enhancement information (SEI) in the geometry subsample.

According to the signaling of these, the client can identify a boundary of a PC sample from the PC header and a boundary of the subsample of each component from the header. Therefore, the client can extract a geometry video stream and a texture video stream from the PC sample in accordance with the boundaries, and individually input to a decoder to perform decode processing.

Note that, as long as the occupancy map and the auxiliary patch info are the same between layers, the same information is signaled in the subsample of each layer. However, the information may be different for every layer. Furthermore, the SEI may also be signaled in the texture subsample.

Furthermore, a known GOF header may be signaled in a GOF head of the PC stream.

FIG. 9 shows an example of information stored in the GOF header.

As shown in FIG. 9, the GOF header stores, for example, information (groupOfFramesSize) indicating the number of frames in Group of Frames. In addition, the GOF header stores the same information as the PC header shown in FIG. 7.

Note that the occupancy map may be encoded by a moving image codec, and used as an occupancy subsample as one type of the component.

With reference to FIGS. 10 to 16, ISOBMFF signaling will be described.

Figure 10:
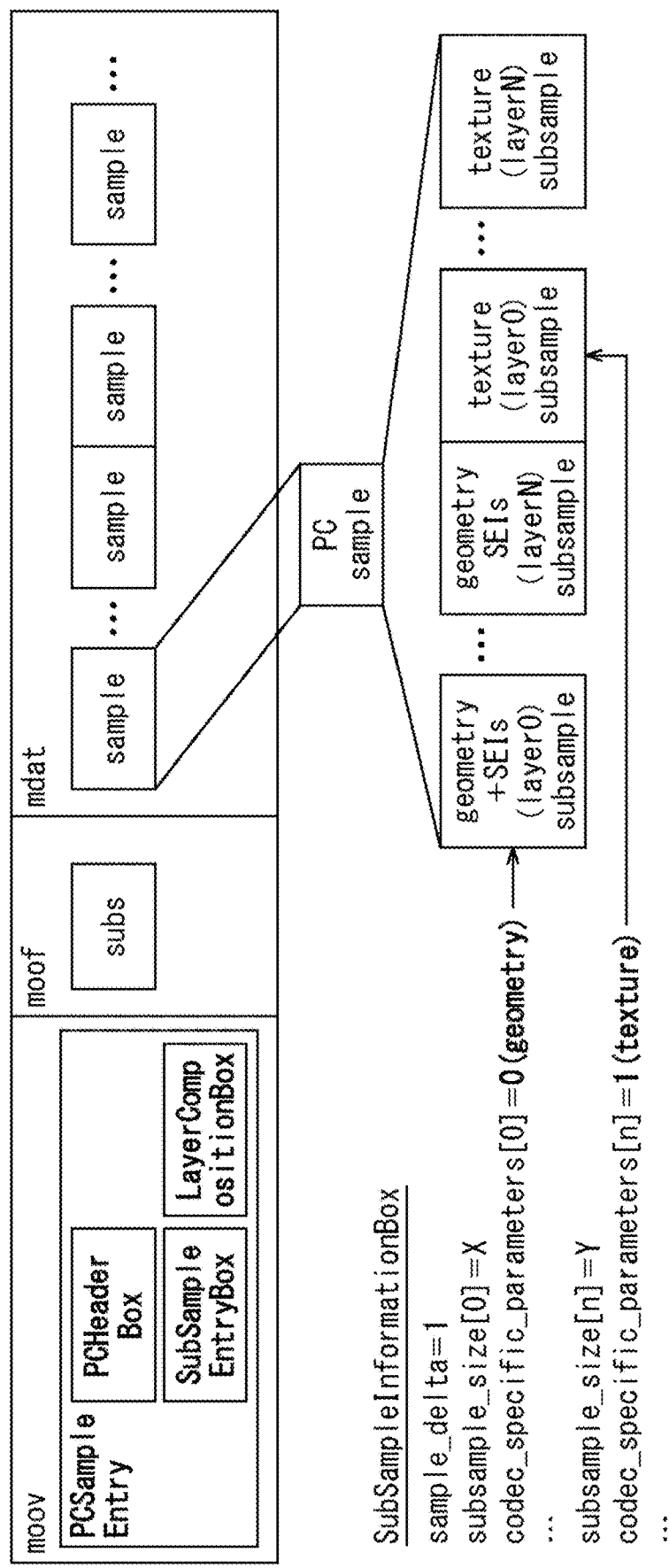
FIG. 10 is a view showing an example of storing a PC stream in one track of ISOBMFF.

FIG. 10 shows an example of storing a PC stream in one track of ISOBMFF.

For example, moov of the ISOBMFF stores PCSampleEntry (see FIG. 12) to be newly defined, and the PCSampleEntry includes PCHeaderBox shown in FIG. 13, SubSampleEntryBox shown in FIG. 14, and LayerCompositionBox shown in FIG. 15.

Furthermore, subs (SubSampleInformationBox) is stored in moof of the ISOBMFF, and the SubSampleInformationBox can be used to signal a boundary between the geometry subsample and the texture subsample in the PC sample, as shown in FIG. 10. Note that SubSampleInformation will be described with reference to an outline of the SubSampleInformationBox shown in FIG. 54 described later.

Then, as a sample stored in mdat of the ISOBMFF, a PC sample as shown in FIG. 6 is stored.

Here, in the SubSampleInformationBox, codec_specific_parameters, which is information of a subsample determined for every encoding codec, is defined.

That is, as shown in FIG. 11, it is indicated that the subsample is a geometry subsample when a value of codec_specific_parameters is 0, and the subsample is a texture subsample when a value of codec_specific_parameters is 1.

Note that the codec_specific_parameters may contain layer identifier information. Furthermore, subsample information may be provided in a unit of a continuous geometry subsample group and texture subsample group. Moreover, in a case of signaling three-dimensional information metadata such as the occupancy map or the auxiliary patch info as the subsample as one type of the component, rather than as SEI, a value indicating each subsample may be added to the subsample information.

FIG. 12 shows a structure of PCSampleEntry to be newly defined in the present disclosure.

In a configuration shown in FIG. 12, a sample entry of a track of the ISOBMFF that stores a PC stream is, for example, 'pcbs'.

As shown in FIG. 13, the same information as the PC header shown in FIG. 7 is described in the PCHeaderBox.

For example, in a case where PC header information changes in a PC stream, the information of PCHeaderBox may be signaled as a sample group. Furthermore, information of the GOF header may be signaled in a sample entry, a sample group, and the like, individually from PCHeaderBox. Note that the Sample Group will be described with reference to an outline of the Sample Group shown in FIG. 55 described later.

Furthermore, at this time, the PC header and the header in the PC sample may not be signaled.

Then, according to the signaling of these, the client can identify a boundary of a PC sample and a boundary of a subsample of each component without parsing a content of the subsample. That is, with simplified processing of referring to only signaling of a system layer, the client can extract a geometry video stream and a texture video stream from the PC sample, and individually input to a decoder to perform decode processing.

As shown in FIG. 14, the SubSampleEntryBox signals a codec of a texture video stream and a geometry video stream including continuous subsamples, and decoder configuration information.

num_of_component shown in FIG. 14 indicates a total number of components stored in the track, and a type field indicates a type of the component to which the sub sample entry corresponds. For example, in a case where the type field is 0, it is indicated that a component type to which a sub sample entry corresponds is a geometry image. In a case where the type field is 1, it is indicated that a component type to which the sub sample entry corresponds is a texture image. SampleEntry( ) changes depending on an encoding codec of the component, and becomes HEVCSampleEntry in a case of being encoded with HEVC, for example.

Furthermore, association with a subsample to which each sub sample entry corresponds is performed in accordance with a type of the component signaled by the codec_specific_parameters of sub sample information and the type of sub sample entry. Note that the encoding codec may be changed for every type of the component.

According to this signaling, the client can identify the codec of the geometry video stream and the texture video stream, and correctly execute decode processing.

As shown in FIG. 15, LayerCompositionBox signals the number of layers having the same composition time, and the number of components included in a PC sample.

For example, num_layer_composed indicates the number of decoded pictures included in one PC frame in an output order. Furthermore, num_of_component indicates the number of components included in one PC frame.

Note that, an example of signaling to the sample entry has been described above, but without limiting to this location, signaling may be made to SubSampleEntryBox, for example. According to this signaling, in subsamples of individual layers of individual components to which different composition times are assigned, subsamples that are included in a Point Cloud displayed at the same time and that should be rendered at the same time can be explicitly indicated. Therefore, the client can properly form and render the Point Cloud.

Figure 16:
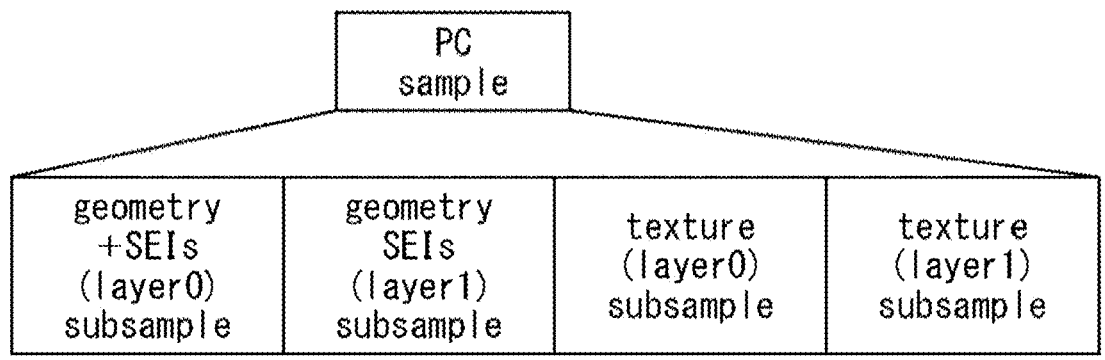
FIG. 16 is a view showing an example of a PC sample with num_layer_composed=2 and num_of_component=2.

FIG. 16 shows an example of a PC sample including a total of four subsamples, in which the number of decoded pictures included in one PC frame in the output order is 2 (num_layer_composed=2), and the number of components included in one PC frame is 2 (num_of_component=2) of a geometry image and a texture image. It is shown that such a PC sample includes four subsamples by the information of LayerCompositionBox shown in FIG. 15.

Note that a configuration in which the number of components is 1 and the number of layers is 2 is similar idea to the conventional technique, for example, temporal interleaving in stereo video. However, the present technology is different in that a configuration with multiple components and multiple layers can be supported, from the conventional technology that cannot support such a configuration.

<First Configuration Example of Information Processing Apparatus>

Figure 17:
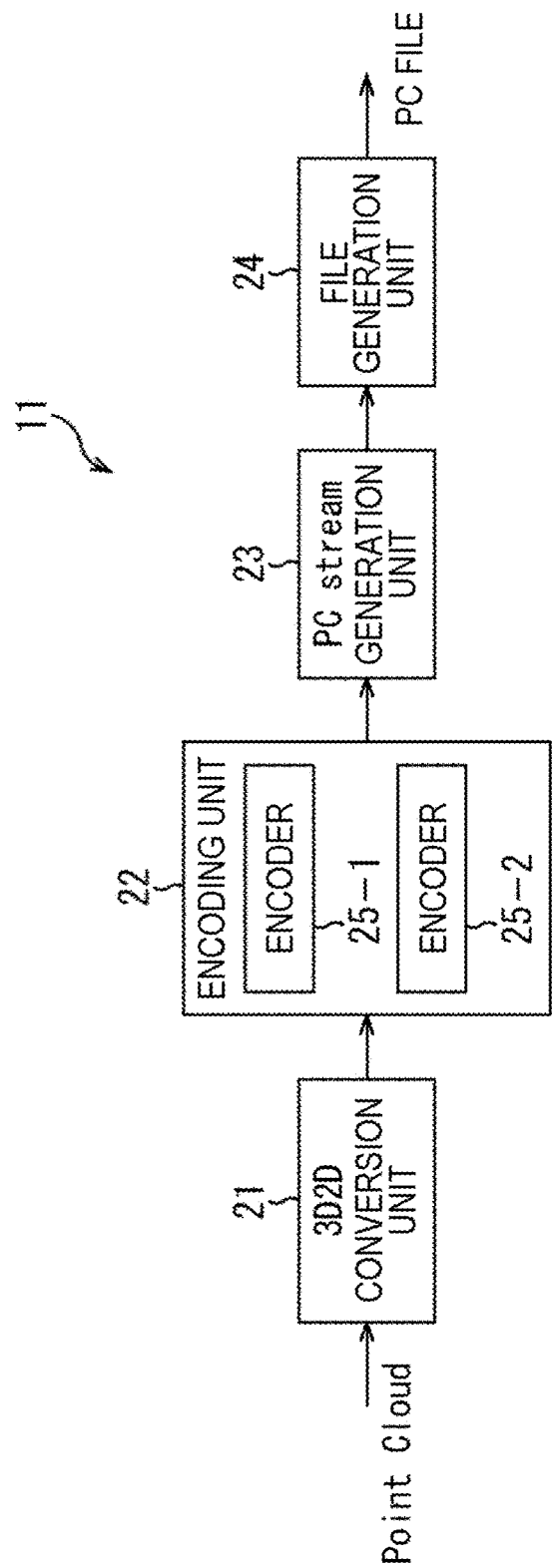
FIG. 17 is a block diagram showing a first configuration example of an information processing apparatus that executes a PC file generation process.

FIG. 17 shows a block diagram showing a first configuration example of an information processing apparatus that executes a PC file generation process of generating a PC stream from a Point Cloud content on a server side that provides the content, and generating a PC file that stores the PC stream in ISOBMFF.

As shown in FIG. 17, an information processing apparatus 11 includes a 3D2D conversion unit 21, an encoding unit 22, a PC stream generation unit 23, and a file generation unit 24.

The 3D2D conversion unit 21 converts an inputted Point Cloud into two dimensions, to generate a geometry image, a texture image, and three-dimensional information metadata (auxiliary patch info and an occupancy map), and supplies to the encoding unit 22.

The encoding unit 22 encodes a geometry video stream containing the three-dimensional information metadata as SEI from the geometry image and the three-dimensional information metadata, and encodes a texture video stream from the texture image. For example, the encoding is performed by non-layered coding such as the encoding unit 22 AVC and HEVC, or layered coding such as SVC and SHEVC. At this time, the encoding unit 22 can perform the encoding of the geometry image and the encoding of the texture image in parallel by two encoders 25-1 and 25-2.

The PC stream generation unit 23 interleaves the geometry video stream and the texture video stream encoded by the encoding unit 22 in a unit forming a PC frame, and generates a PC sample as shown in FIG. 5. Then, the PC stream generation unit 23 generates a PC stream including multiple PC samples, and supplies to the file generation unit 24.

The file generation unit 24 generates a PC file by storing a geometry image, a texture image, and three-dimensional information metadata in one track of ISOBMFF, in accordance with a playback order required at a time of reproducing and playing back the geometry image and the texture image in three dimensions on the basis of the three-dimensional information metadata.

The information processing apparatus 11 configured in this way can generate a PC stream from a Point Cloud content, and output a PC file in which the PC stream is stored in one track of ISOBMFF.

Figure 18:
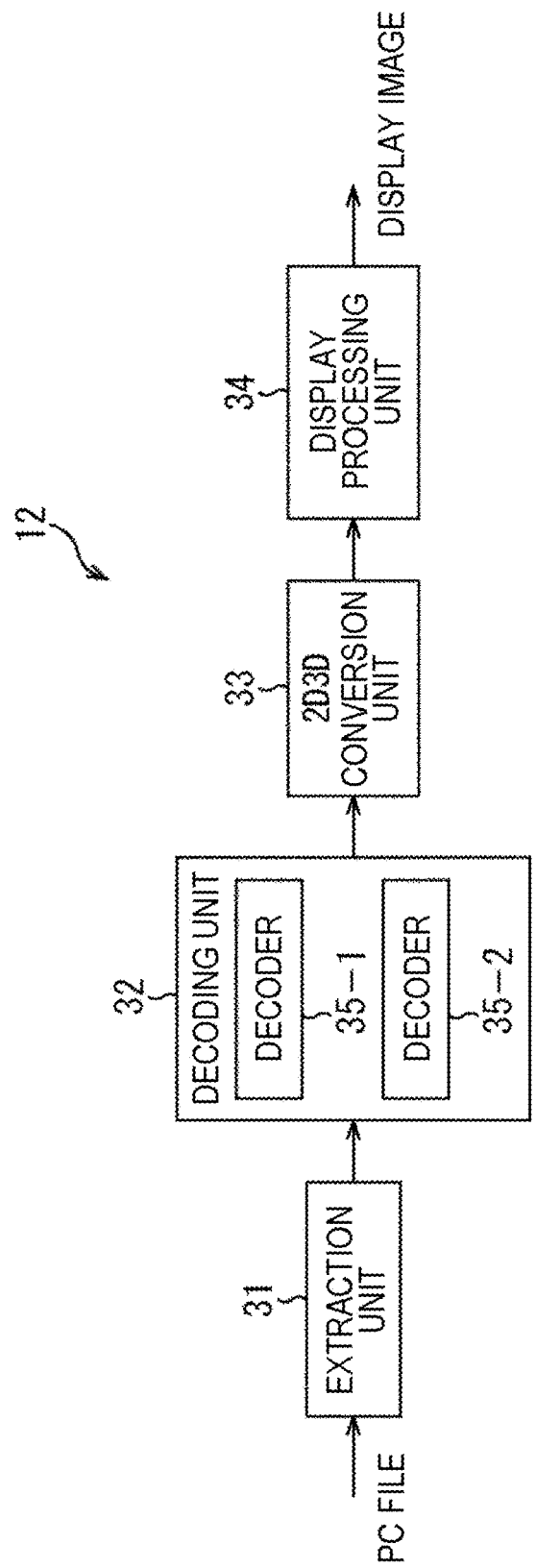
FIG. 18 is a block diagram showing a first configuration example of an information processing apparatus that executes a Point Cloud playback process.

FIG. 18 is a block diagram showing a first configuration example of an information processing apparatus that executes a Point Cloud playback process of generating a display image from a PC file and playing back a Point Cloud, on a client side that plays back a content.

As shown in FIG. 18, an information processing apparatus 12 includes an extraction unit 31, a decoding unit 32, a 2D3D conversion unit 33, and a display processing unit 34.

The extraction unit 31 extracts a geometry video stream and a texture video stream corresponding to a playback time from a PC file on the basis of information signaled by a Box of ISOBMFF, and supplies to the decoding unit 32.

The decoding unit 32 decodes the geometry video stream and the texture video stream supplied from the extraction unit 31, and supplies to the 2D3D conversion unit 33. At this time, the decoding unit 32 can perform the decoding of the geometry image and the decoding of the texture image in parallel by two decoders 35-1 and 35-2.

The 2D3D conversion unit 33 constructs a Point Cloud on the basis of SEI information contained in the geometry video stream.

The display processing unit 34 renders the Point Cloud constructed by the 2D3D conversion unit 33 in accordance with a display device of the client, generates a display image, and causes the display device (not shown) to display.

The information processing apparatus 12 configured in this way can play back the Point Cloud from the PC file, and control to display the display image obtained by rendering the Point Cloud.

<First Processing Example of PC File Generation Process and Point Cloud Playback Process>

Figure 19:
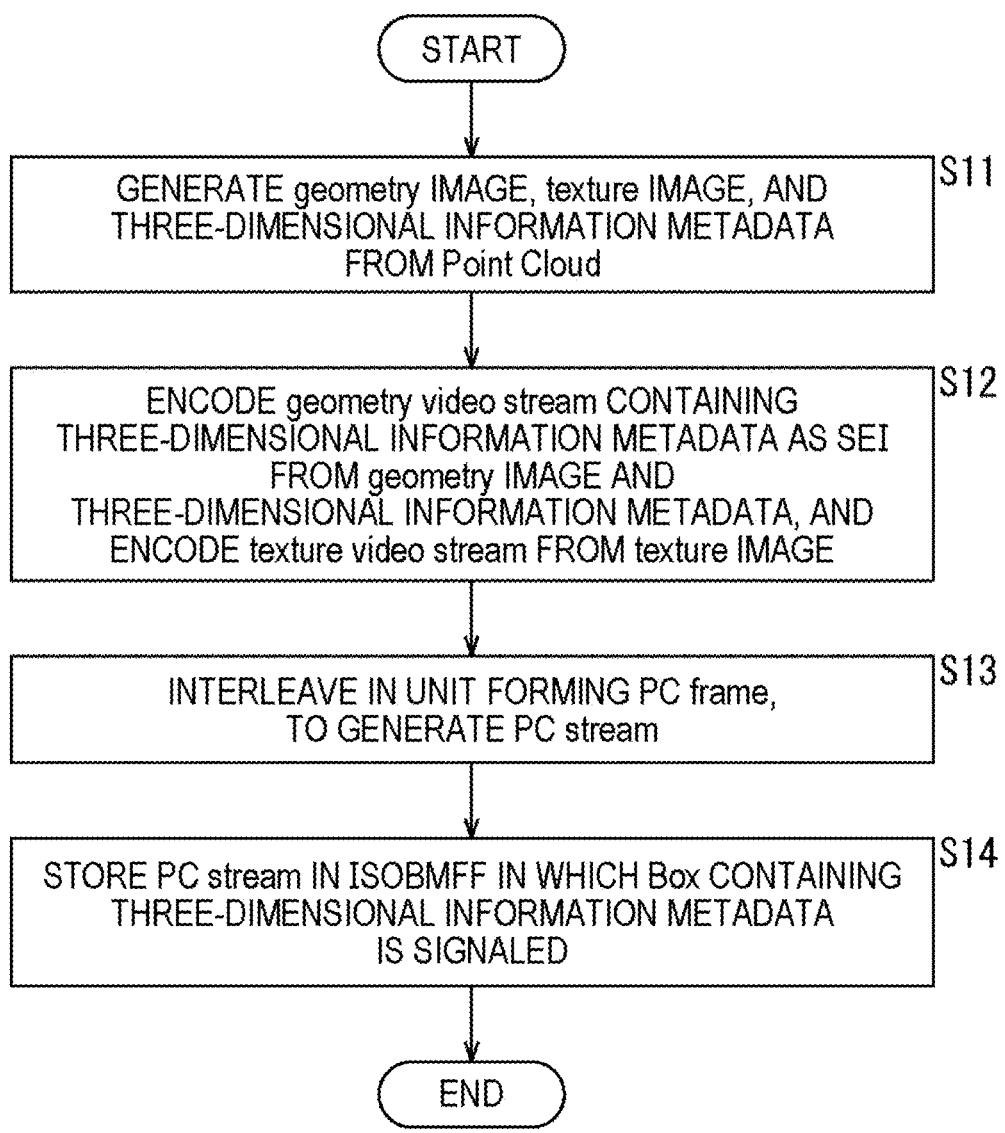
FIG. 19 is a flowchart for explaining a first processing example of the PC file generation process.

FIG. 19 is a flowchart for explaining a PC file generation process in which the information processing apparatus 11 in FIG. 17 generates a PC file from a Point Cloud.

For example, when a Point Cloud is inputted to the information processing apparatus 11, processing is started. Then, in step S11, the 3D2D conversion unit 21 generates a geometry image, a texture image, and three-dimensional information metadata from the inputted Point Cloud.

In step S12, the encoding unit 22 encodes a geometry video stream containing the three-dimensional information metadata as SEI from the geometry image and the three-dimensional information metadata generated by the 3D2D conversion unit 21 in step S11, and encodes a texture video stream from the texture image.

In step S13, the PC stream generation unit 23 interleaves in a unit (a PC sample) forming the PC frame, to generate a PC stream.

In step S14, the file generation unit 24 stores a PC stream in ISOBMFF in which a Box containing the three-dimensional information metadata is signaled, to generate a PC file. At this time, a sample of the ISOBMFF is to be a PC sample.

Figure 20:
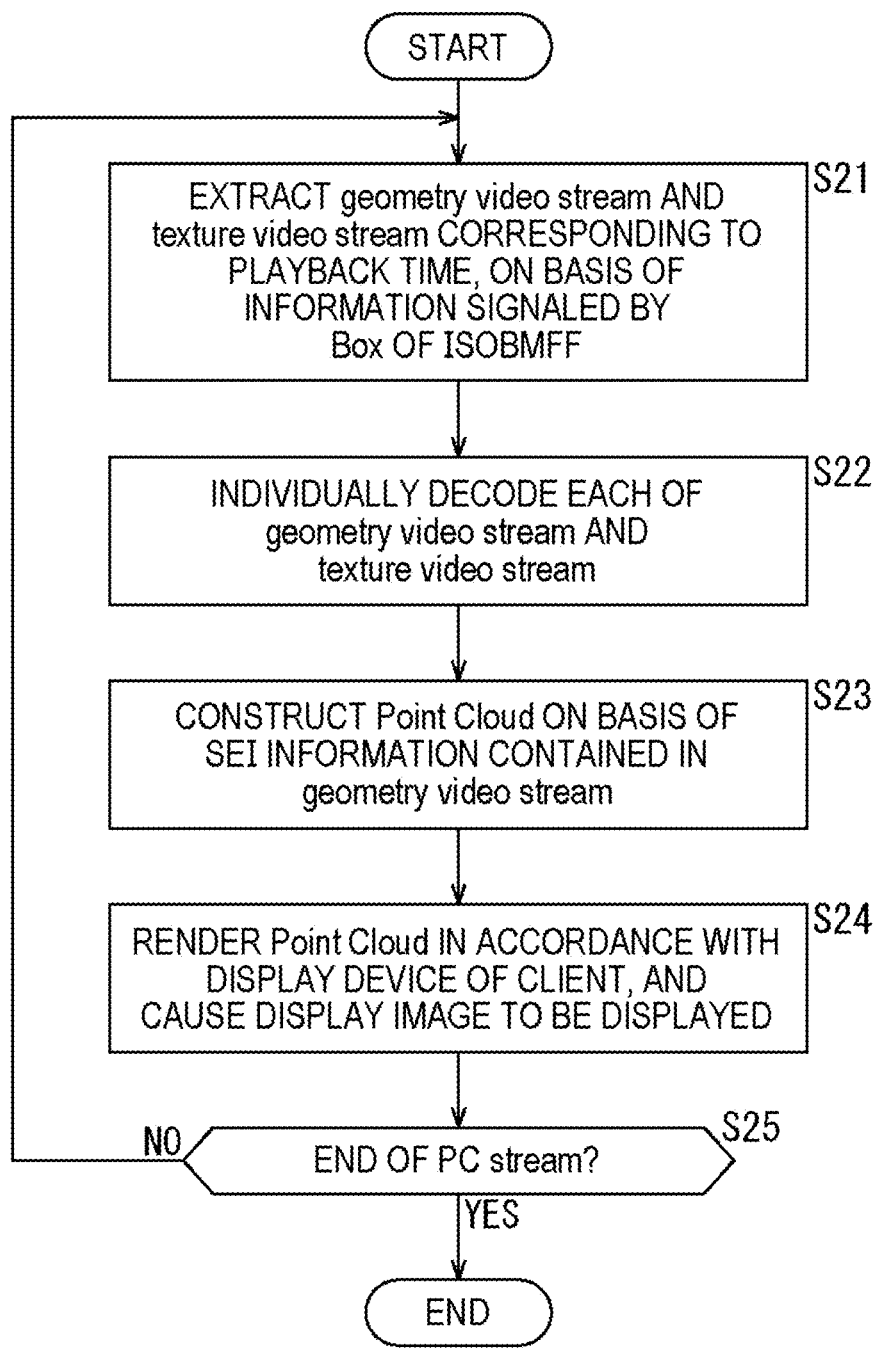
FIG. 20 is a flowchart for explaining a first processing example of the Point Cloud playback process.

FIG. 20 is a flowchart for explaining a Point Cloud playback process in which the information processing apparatus 12 of FIG. 18 generates a display image from a PC file and plays back.

For example, when supply to the information processing apparatus 12 starts from a head of a PC file, processing is started. Then, in step S21, the extraction unit 31 extracts a geometry video stream and a texture video stream corresponding to a playback time from a PC file on the basis of information signaled by a Box of ISOBMFF.

In step S22, the decoding unit 32 individually decodes each of the geometry video stream and the texture video stream. At this time, the geometry video stream and the texture video stream are individually decoded with two decoder instances.

In step S23, the 2D3D conversion unit 33 constructs a Point Cloud on the basis of SEI information contained in the geometry video stream.

In step S24, the display processing unit 34 renders the Point Cloud in accordance with a display device of the client, to cause a display image to be displayed.

In step S25, the extraction unit 31 determines whether or not it is an end of the PC stream. In a case of being not the end of the PC stream, the process returns to step S21, and in a case of being the end of the PC stream, the process ends.

By the PC file generation process and the Point Cloud playback process as described above, processing on the client side can be performed simply.

Here, FIG. 21 shows an example of an ISOBMFF structure when a PC stream is stored in the ISOBMFF structure by the first storage method.

Note that, as a modified example, at a time of storing the PC stream in the ISOBMFF structure by the first storage method, a boundary of a Group of Frames may be signaled with use of a sample group, similarly to ISOBMFF signaling in a third storage method described later. Furthermore, in encoding of an elementary stream, layered coding such as scalable video coding (SVC) or scalable high efficiency video coding (SHEVC) may be used rather than non-layered coding such as AVC and HEVC.

For example, layer 0 of the geometry video stream and the texture video stream is encoded as a base layer, and layer 1 of the geometry video stream and the texture video stream is encoded as an enhancement layer.

Figure 22:
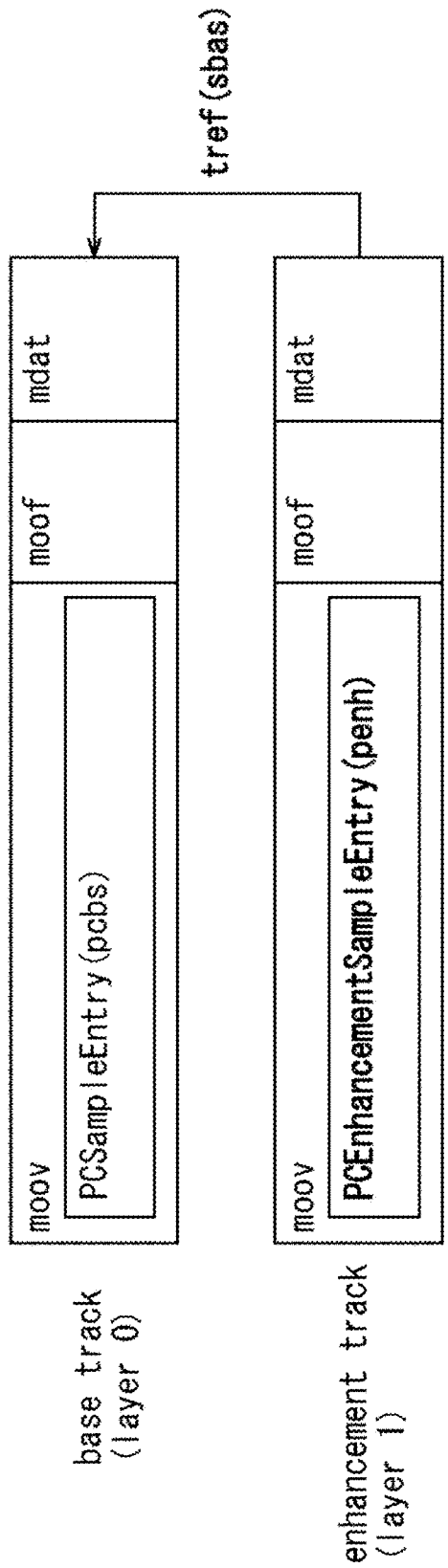
FIG. 22 is a view for explaining association from an enhancement track to a base track by a track reference.

That is, as shown in FIG. 22, in a case where one layer is stored in one track of ISOBMFF, an enhancement track stores the geometry video stream and the texture video stream of the enhancement layer, and a base track stores the geometry video stream and the texture video stream of the base layer. Then, association is made from the enhancement track to the base track by a track reference (reference type 'sbas'). At this time, a sample entry of the base track is PCSampleEntry ('pcbs'), and a sample entry of the enhancement track is PCEnhancementSampleEntry ('penh'). For example, enhancement tracks exist in accordance with the number of layers.

Here, for example, in order to indicate whether the layer stored in each track is layer 0 or layer 1, a layer identifier (for example, layer_id in FIG. 8) signaled by the header in the PC sample may be signaled by the sample entry of each track. Alternatively, the header itself in the PC sample may be stored in the sample entry of each track.

<Second Storage Method>

With reference to FIGS. 23 to 35, a description is given to a second storage method, which is a method of packing geometry/texture video streams into one stream and storing in one track of ISOBMFF.

In the first storage method described above, it is possible to realize decode processing by one decoder, by interleaving a texture image and a geometry image before encoding, and encoding as one video stream. However, in such encoding, since correlation between the texture image and the geometry image is small, compression efficiency deteriorates.

Furthermore, in the first storage method, it is also possible to decode a generated single stream by one decoder. However, since initialization of the decoder is required at a boundary between a texture image and a geometry image that have been encoded, overhead will increase.

That is, in the first storage method, it has been necessary to individually encode a texture video stream and a geometry video stream in the PC file generation process, and perform individual decoding with two decoder instances for the geometry video stream and the texture video stream in the Point Cloud playback process. Therefore, when the first storage method is applied to decoding with one decoder instance, compression efficiency will deteriorate and overhead will increase.

Therefore, in the second storage method, multiple images are packed into one image by the method described in Patent Document 1 described above or the like, and encoded to form a PC stream. For example, it is possible to pack images of multiple components into one image, pack images of multiple layers into one image, and pack images of multiple layers of multiple components into one image. This configuration enables decode processing with one decoder instance by a client, while avoiding the deterioration of the compression efficiency as described above. Note that, as a packing method, in addition to adopting methods such as a side by side and top & bottom, another method may be adopted.

Figure 23:
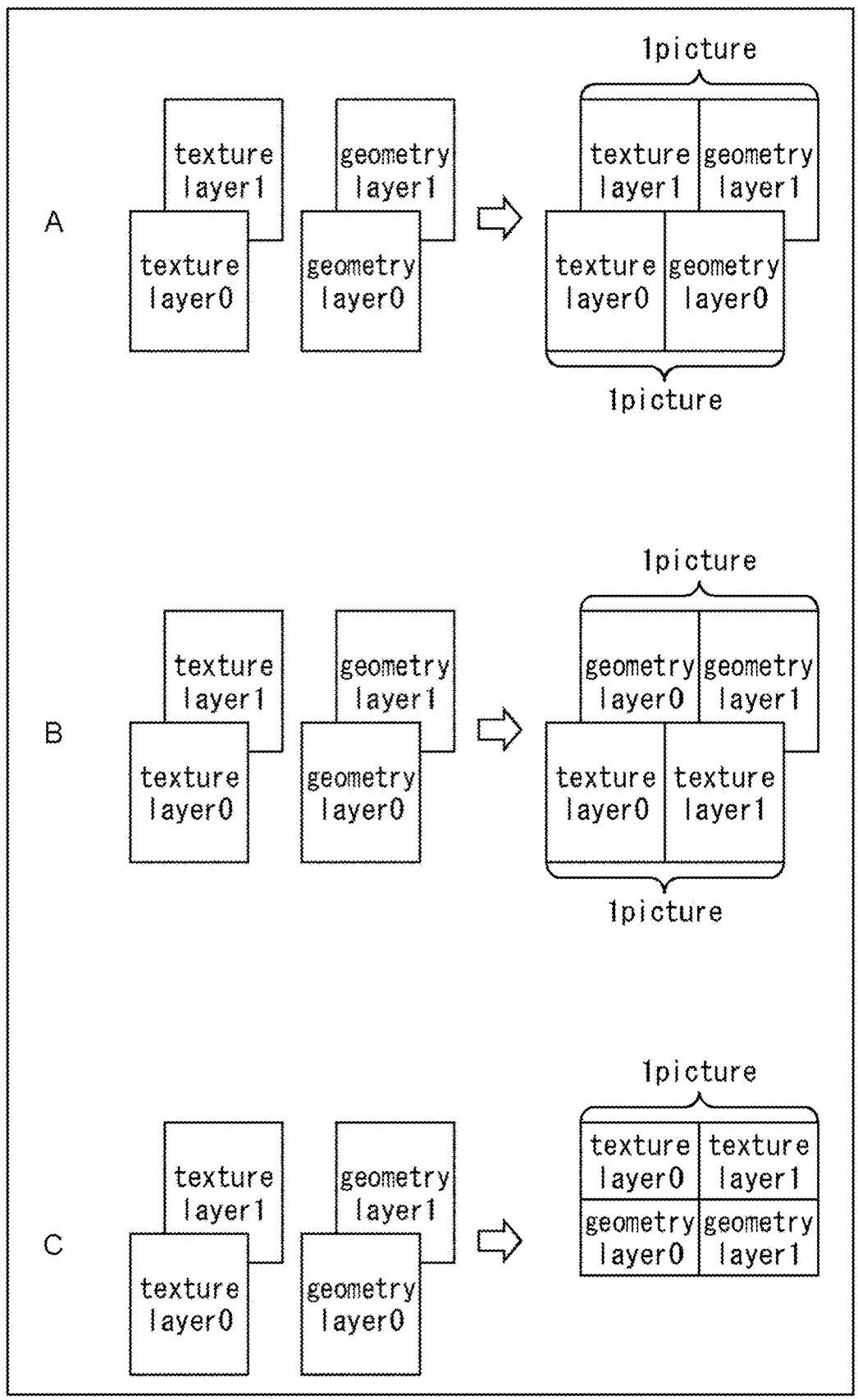
FIG. 23 is a view showing packing variations.

With reference to FIG. 23, packing variations will be described.

A of FIG. 23 shows an example of packing the same layers of different components into one image by the side by side method. That is, a texture image of layer 0 and a geometry image of layer 0 are packed by the side by side into one image, and a texture image of layer 1 and a geometry image of layer 1 are packed by the side by side into one image.

B of FIG. 23 shows an example in which images of different layers of the same components are packed into one image by the side by side method. That is, a texture image of layer 0 and a texture image of layer 1 are packed into one image by the side by side, and a geometry image of layer 0 and a geometry image of layer 1 are packed into one image by the side by side.

Note that, in the packing shown in B in FIG. 23, decode processing with one decoder instance is possible, but the deterioration of the compression efficiency cannot be improved since correlation between the texture image and the geometry image is small as described above. However, in a case where there is a high image correlation between layers, it is possible to improve the encoding efficiency by providing a reference relationship in the packed images. Note that the packing shown in B of FIG. 23 is effective packing in a case where a geometry video stream and a texture video stream are divided and stored in a track, as in a fourth storage method as described later.

C of FIG. 23 shows an example of packing of images of all layers of all components into one image, by packing, into one image by the top & bottom method, two images in which images of different layers of the same component are packed into one image by the side by side method. That is, a texture image of layer 0 and a texture image of layer 1 are packed into one image by the side by side, and a geometry image of layer 0 and a geometry image of layer 1 are packed into one image by the side by side. Then, by packing those two images into one image with the top & bottom, the texture image of layer 0, the texture image of layer 1, the geometry image of layer 0, and the geometry image of layer 1 are packed into one image.

Here, as described with reference to FIG. 23, one image obtained by packing multiple images is hereinafter referred to as a packed PC image. Then, an encoded sequence of the packed PC image is referred to as a packed PC stream, and a packed PC stream stored in the ISOBMFF is referred to as a packed PC file.

Note that the packing method in the second storage method described here is a technique different from stereo packing, which is a prior art related to stereoscopic vision using parallax, in that images that are significantly different from each other are packed such as, for example, a geometry image and a texture image.

In the following, a description is given to an example of using a packed PC image in which images of the same layer of different components are packed into one image, as shown in A of FIG. 23.

Figures 24, 25:
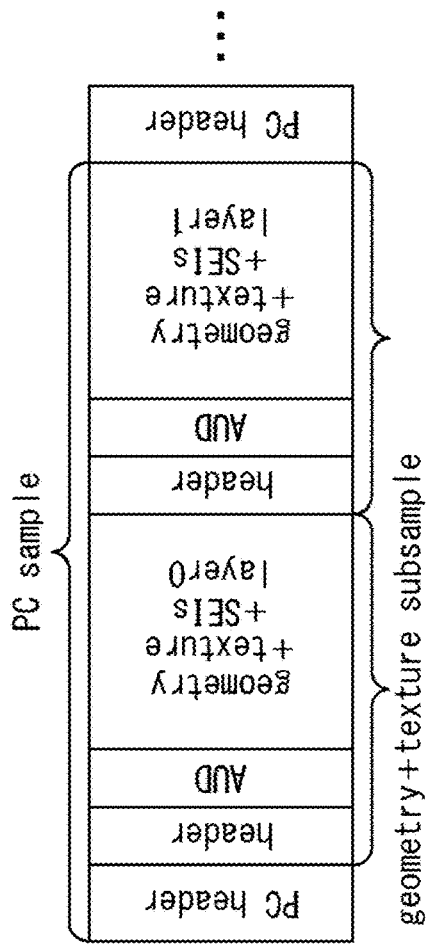
FIG. 24 is a view showing an example of elementary stream signaling.
FIG. 25 is a view showing an example of SEI to be newly defined.

FIG. 24 shows an example of elementary stream signaling.

FIG. 24 shows an example of a PC sample in a case where the number of layers is 2 and a moving image codec used for encoding is AVC or HEVC.

As shown in FIG. 24, it is different from the first storage method (see FIG. 6 above) in that one subsample is one packed PC image included in a packed PC stream in which a geometry image and a texture image are packed into one image.

Furthermore, in the second storage method, a header signals geometry+texture as a type of the subsample, in addition to the information defined in the first storage method.

For example, as shown in FIG. 25, point cloud frame packing SEI can be newly defined and signaled as SEI. The SEI shown in FIG. 25 has information regarding a packing method for a geometry image and a texture image.

For example, as shown in FIG. 26, in the SEI, in a case where packing_arrangement is 0, it is indicated that the packing is the side by side. In a case where the packing_arrangement is 1, it is indicated that the packing is the top & bottom. Furthermore, in a case where the packing_arrangement is other than the above, it is indicated that the packing is reserved. Similarly, in the SEI, in a case where frame0_is_geometry is 0, it is indicated that frame0 is geometry, and in a case where frame0_is_geometry is 1, it is indicated that frame0 is texture.

Figure 27:
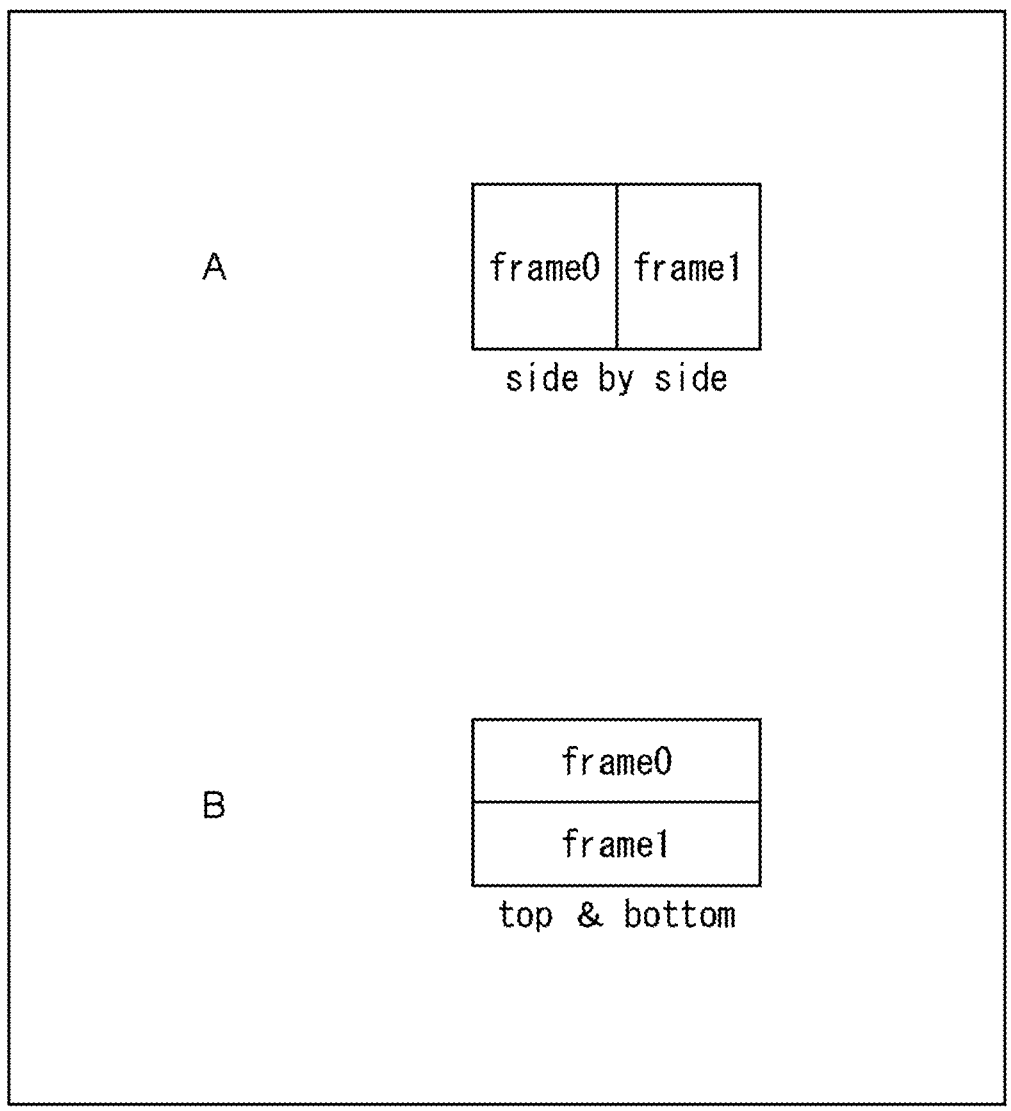
FIG. 27 is a view showing a definition of frame0.

Here, a definition of frame0 is as shown in FIG. 27. For example, in a case of the side by side, as shown in A of FIG. 27, packing is performed so that frame0 is on a left side and frame1 is on a right side. Furthermore, in a case of the top & bottom, as shown in B of FIG. 27, the packing is performed so that frame0 is on an upper side and frame1 is on a lower side.

Note that, without limiting to the SEI, the signaling of the information may be made at another place, for example, a PC header. Furthermore, as the packing method, a method other than the side by side and the top & bottom may be used.

Furthermore, in a case where chroma subsampling is 4:2:2, 4:2:0, and the like, encode processing and component cutting processing can be easily performed by considering thinning out of a color difference signal and setting, to a multiple of 2 pixels, a width and a height of each component to be packed. Furthermore, by setting a width and a height of each component to be packed to a number of pixels that is a multiple of 8 or 16, affinity with a block size at a time of encoding can be enhanced, and the encode processing and the component cutting processing can be easily performed.

As described above, according to the signaling of these, a boundary of the PC sample can be identified from the PC header, and a boundary of the subsample can be identified by the header. Furthermore, the texture image and the geometry image can be separated, from the point cloud frame packing SEI. This configuration allows the client to correctly form the Point Cloud and render after decoding the subsample.

Figure 28:
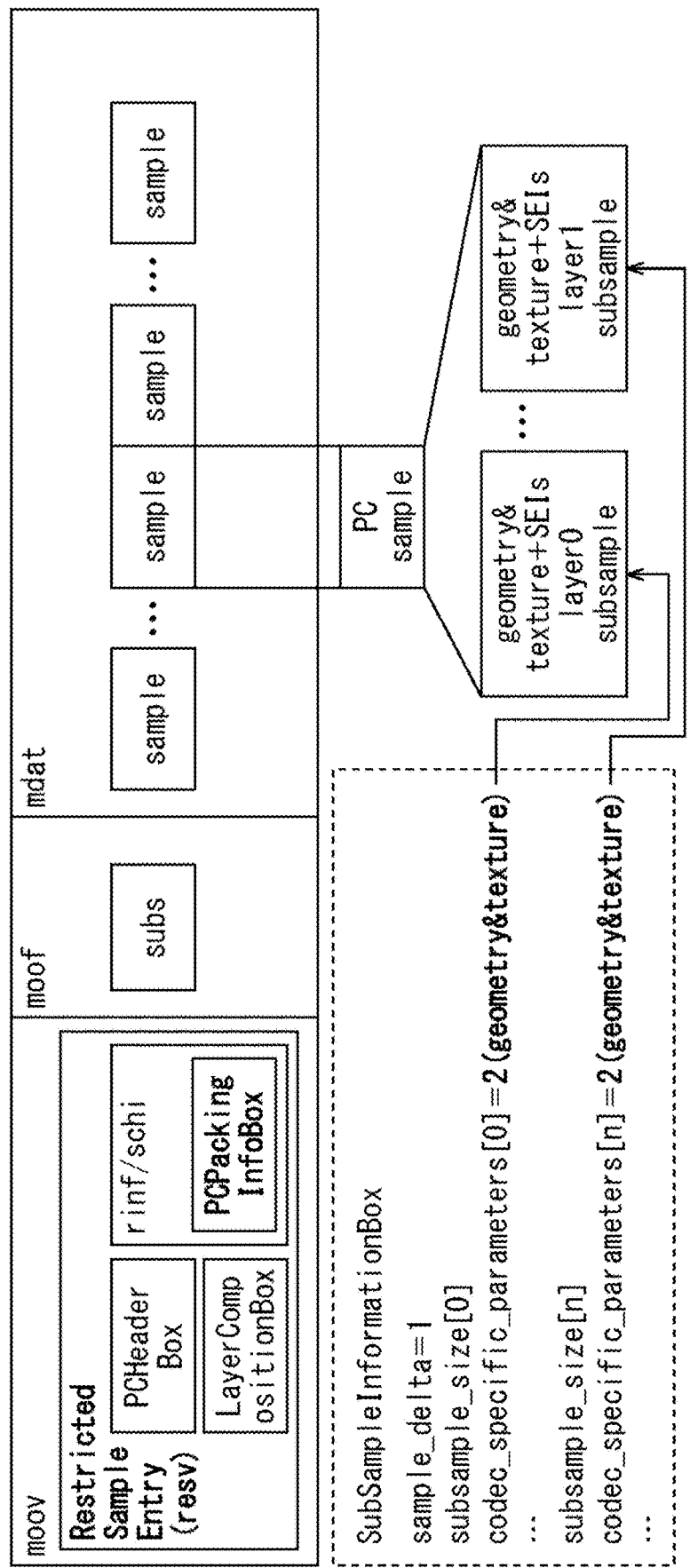
FIG. 28 is a view showing an example of storing a PC stream in one track of ISOBMFF.

FIG. 28 shows an example of storing, in one track of ISOBMFF, a packed PC stream obtained by encoding a packed PC image.

As shown in FIG. 28, when a value of codec_specific_parameters of SubSampleInformationBox ('subs') is 2, it is indicated that the subsample is a geometry&texture subsample. That is, the second storage method differs from the first storage method in that 2 is used in addition to 0 and 1 described with reference to FIG. 11 for the value of codec_specific_parameters. In this way, the SubSampleInformationBox can be used to signal a boundary of the geometry&texture subsample in the PC sample. Note that SubSampleInformation will be described with reference to an outline of the SubSampleInformationBox shown in FIG. 54 described later.

Furthermore, as shown in FIG. 29, similarly to the point cloud frame packing SEI shown in FIG. 25, PCPackingInfoBox having information regarding a packing method of the texture image and the geometry image is signaled in the sample entry.

Note that the modified example described in the first storage method can be similarly applied to the second storage method.

Furthermore, the second storage method is operated as, for example, a restricted scheme in the first storage method, in which a sample entry is 'resv', and scheme_type of SchemeTypeBox is 'pacp'. At this time, the PCPackingInfoBox used for post-decode processing is signaled under rinf/schi as shown in FIG. 28.

<Second Configuration Example of Information Processing Apparatus>

Figure 30:
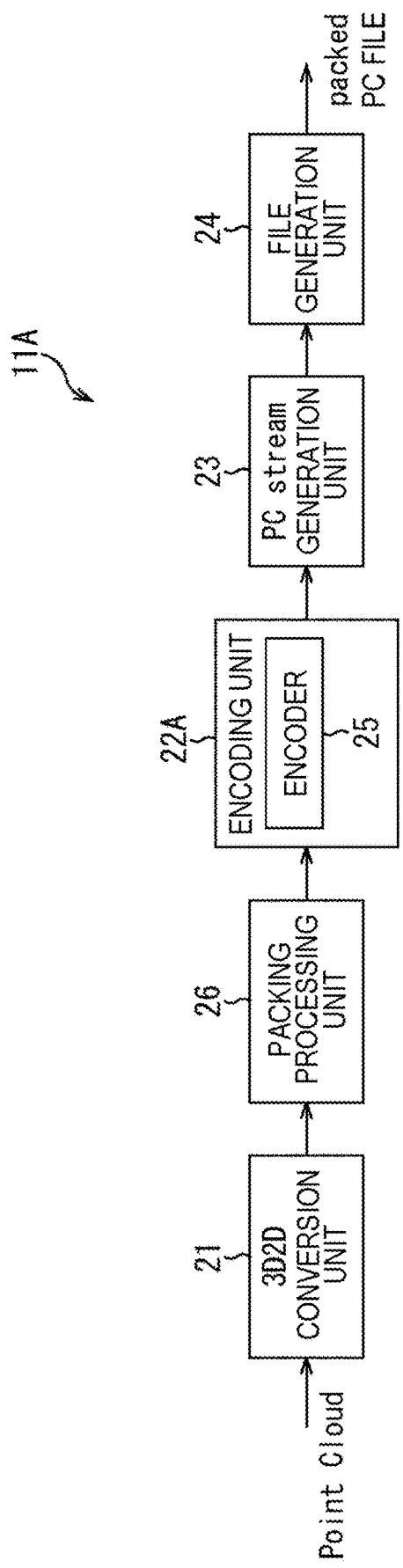
FIG. 30 is a block diagram showing a second configuration example of an information processing apparatus that executes a packed PC file generation process.

FIG. 30 shows a block diagram showing a second configuration example of an information processing apparatus that executes a PC file generation process of generating a PC file from a Point Cloud content on a server side that provides the content. Note that, in an information processing apparatus 11A shown in FIG. 30, the same configurations as those of the information processing apparatus 11 in FIG. 17 will be denoted by the same reference numerals, and detailed description thereof will be omitted.

As shown in FIG. 20, the information processing apparatus 11A includes a 3D2D conversion unit 21, an encoding unit 22A, a PC stream generation unit 23, a file generation unit 24, and a packing processing unit 26.

That is, the information processing apparatus 11A has a configuration different from that of the information processing apparatus 11 of FIG. 17 in that the packing processing unit 26 is provided, and the encoding unit 22A has one encoder 25.

The packing processing unit 26 packs a texture image and a geometry image and individual layers thereof by a packing method as described above, and supplies a packed PC image to the encoding unit 22A.

The encoding unit 22A can encode the packed PC image with one encoder 25.

Figure 31:
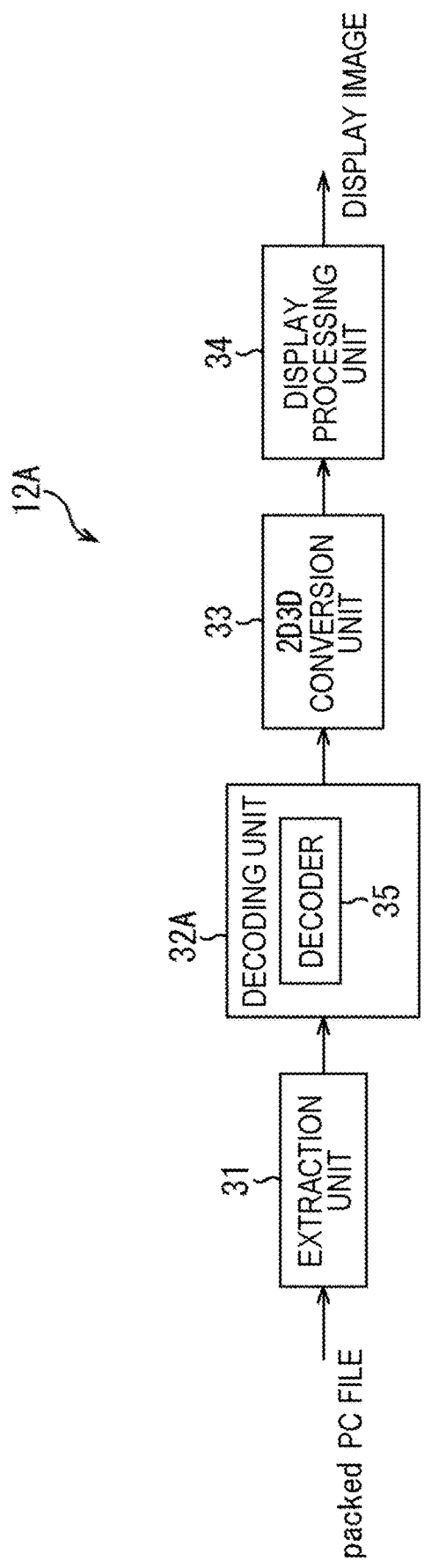
FIG. 31 is a block diagram showing a second configuration example of an information processing apparatus that executes the Point Cloud playback process.

FIG. 31 is a block diagram showing a second configuration example of an information processing apparatus that executes a Point Cloud playback process of generating a display image from a packed PC file and playing back a Point Cloud, on a client side that plays back the content. Note that, in an information processing apparatus 12A shown in FIG. 31, the same configurations as those of the information processing apparatus 12 in FIG. 18 will be denoted by the same reference numerals, and detailed description thereof will be omitted.

That is, the information processing apparatus 12A has a configuration different from that of the information processing apparatus 12 in FIG. 18 in that a decoding unit 32A has one decoder 35.

In the information processing apparatus 12A, an extraction unit 31 can extract a packed PC stream corresponding to a playback time from a packed PC file on the basis of information signaled by a Box of ISOBMFF, and the decoding unit 32A can decode the packed PC stream with one decoder 35.

<Processing Example of Packed PC File Generation Process and Point Cloud Playback Process>

Figure 32:
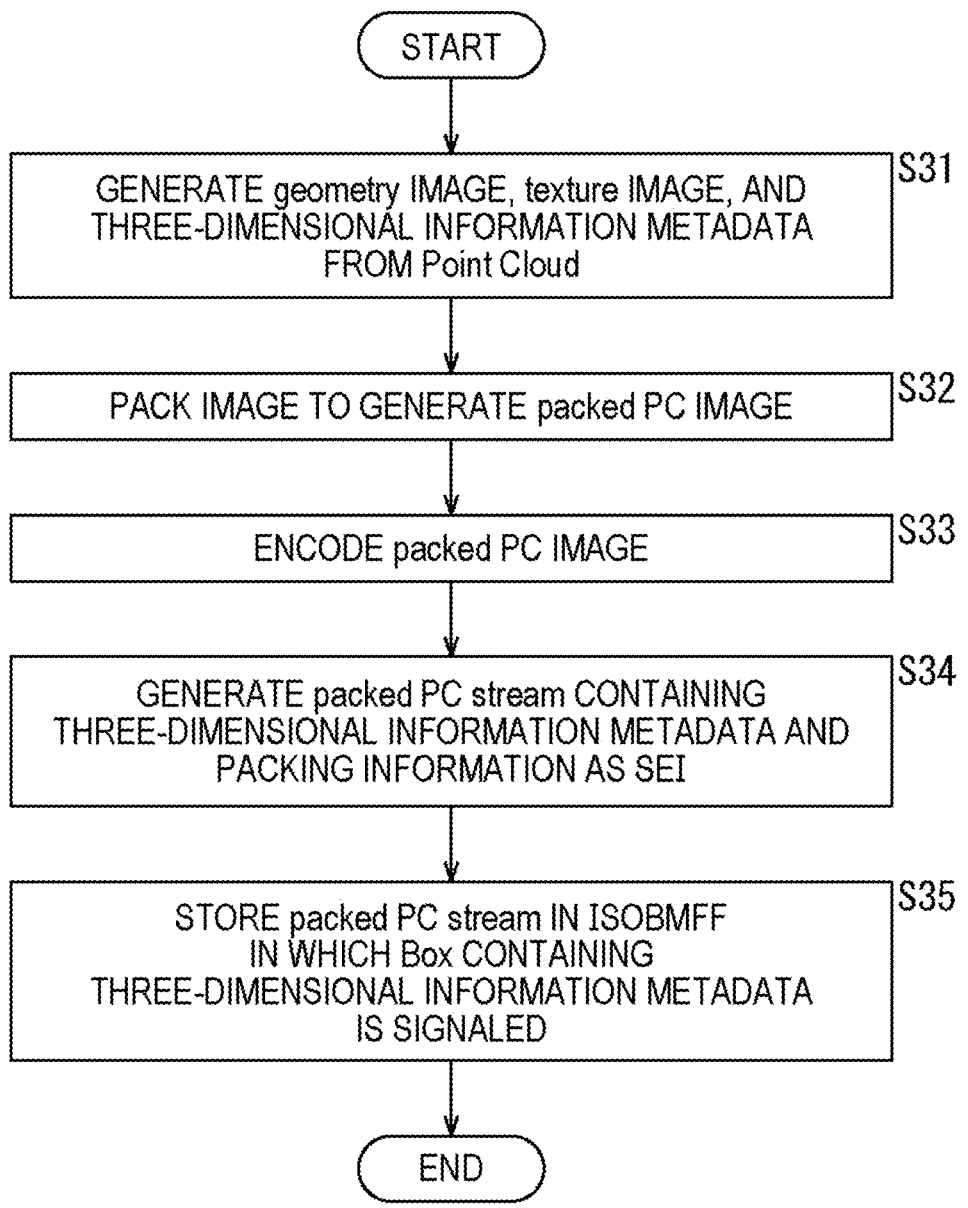
FIG. 32 is a flowchart for explaining a second processing example of the packed PC file generation process.

FIG. 32 is a flowchart for explaining a packed PC file generation process in which the information processing apparatus 11A in FIG. 30 generates a packed PC stream from a Point Cloud, and generates a packed PC file in which the packed PC stream is stored in ISOBMFF.

For example, when a Point Cloud is inputted to the information processing apparatus 11A, processing is started. Then, in step S31, the 3D2D conversion unit 21 generates a geometry image, a texture image, and three-dimensional information metadata from the inputted Point Cloud.

In step S32, the packing processing unit 26 packs the texture image and the geometry image and individual layers thereof, to generate a packed PC image.

In step S33, the encoding unit 22A encodes the packed PC image generated by the 3D2D conversion unit 21 in step S32.

In step S34, the PC stream generation unit 23 interleaves in a unit forming a packed PC stream, and generates a packed PC stream containing the three-dimensional information metadata and packing information as SEI.

In step S35, the file generation unit 24 stores the packed PC stream in ISOBMFF in which a Box containing the three-dimensional information metadata is signaled, to generate a packed PC file. At this time, a sample of the ISOBMFF is to be a PC sample.

Figure 33:
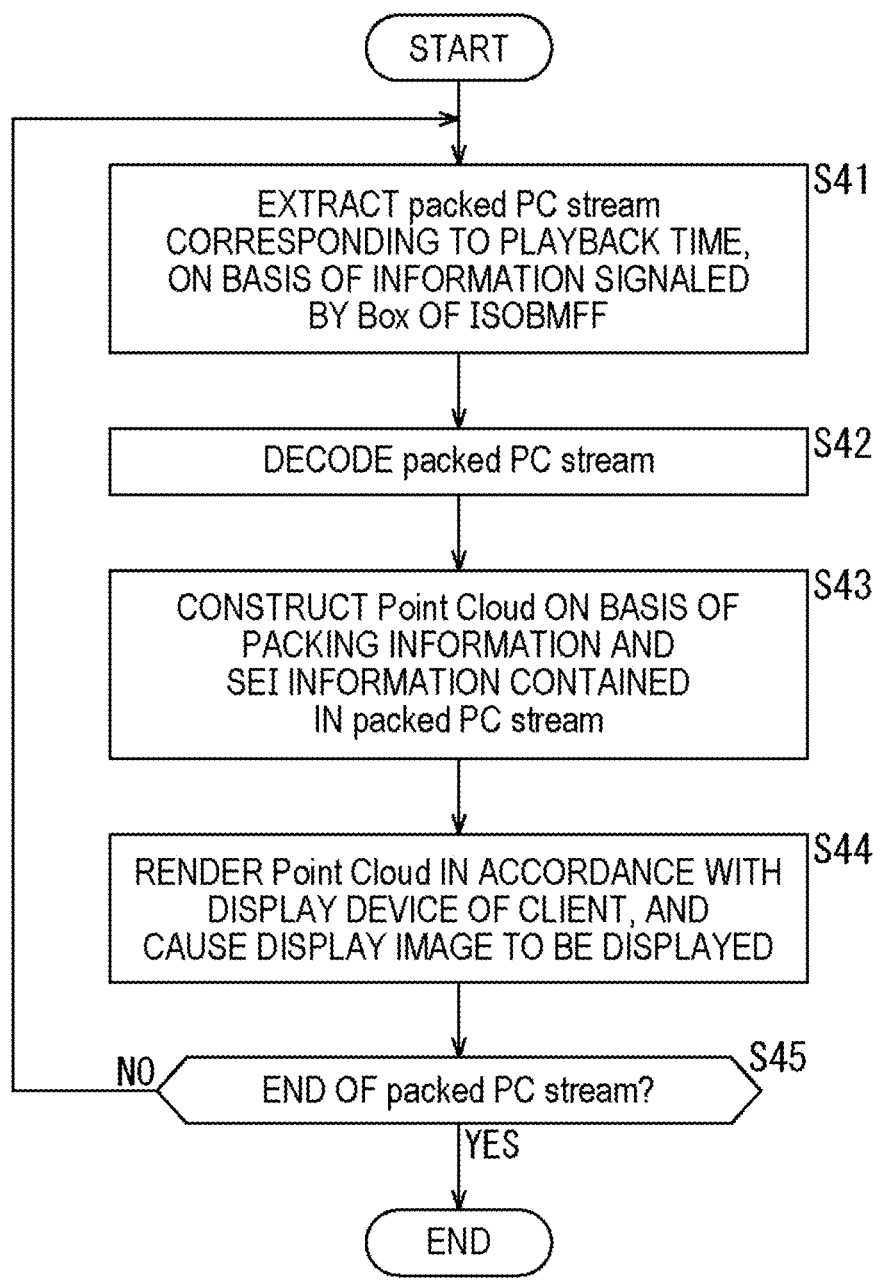
FIG. 33 is a flowchart for explaining a second processing example of the Point Cloud playback process.

FIG. 33 is a flowchart for explaining a Point Cloud playback process in which the information processing apparatus 12A of FIG. 31 generates a display image from the packed PC file and plays back.

For example, when supply to the information processing apparatus 12A starts from a head of a PC stream, processing is started. Then, in step S41, the extraction unit 31 extracts a packed PC stream corresponding to a playback time from the packed PC file on the basis of information signaled by a Box of ISOBMFF.

In step S42, the decoding unit 32A decodes the packed PC stream. At this time, the packed PC stream is decoded with one decoder instance.

In step S43, a 2D3D conversion unit 33 constructs a Point Cloud on the basis of packing information and SEI information contained in the packed PC stream.

In step S44, a display processing unit 34 renders the Point Cloud in accordance with a display device of the client, to cause a display image to be displayed.

In step S45, the extraction unit 31 determines whether or not it is an end of the PC stream. In a case of being not the end of the PC stream, the process returns to step S41, and in a case of being the end of the PC stream, the process ends.

By the packed PC file generation process and the Point Cloud playback process as described above, processing on the client side can be performed simply.

Here, FIG. 34 shows an example of an ISOBMFF structure when a packed PC stream is stored in the ISOBMFF structure by the second storage method.

According to the signaling of these, the client can identify a boundary of a PC sample and a boundary of a subsample of each component without parsing a content of the subsample. Then, the client can acquire information required for separating a texture image and a geometry image, from the PCPackingInfoBox. Therefore, the client performs the decode processing by extracting the packed PC stream from the PC sample, with simplified processing of referring to only signaling of a system layer.

Thereafter, the client can separate the geometry image and the texture image from the packed PC image, and form the Point Cloud to execute rendering.

Note that, similarly to the packing shown in A of FIG. 23, for example, also in the packing shown in B of FIG. 23 and the packing shown in C of FIG. 23, the packing method can be signaled by the point cloud frame packing SEI (FIG. 25) and the PCPackingInfoBox (FIG. 29). This configuration allows the client to separate each layer of the texture image and the geometry image.

Furthermore, it is possible to perform packing with flexibility, for example, by signaling arrangement, a position, a size, and the like of each component and each layer in a picture, by the point cloud frame packing SEI and the PCPackingInfoBox.

FIG. 35 shows a modified example of the PCPackingInfoBox.

As shown in FIG. 35, in the PCPackingInfoBox, for example, there are described information (component_num) indicating the number of components included in a packed PC image, information (layer_num) indicating the number of layers included in the packed PC image, and information (component_type) indicating a type of the component. For example, in a case where component_type is 0, it is indicated that the component type is a geometry image. In a case where component_type is 1, it is indicated that the component type is a texture image. Furthermore, in the PCPackingInfoBox, there are described a layer identifier (layer_id), and information (left/top) indicating a position where an image indicated by component_type and layer_id is arranged in the packed PC image and information (width/height) indicating a size of these.

Note that, for example, in addition to treating the geometry image and the texture image as components as described above, the occupancy map may be treated as a component. In this case, the occupancy map can also be packed together with the geometry image and the texture image.

<Third Storage Method>

With reference to FIGS. 36 to 43, a third storage method, which is a method of storing a PC stream in one track of ISOBMFF without defining a PC sample, will be described. Here, the third storage method is a modified example of the first storage method and the second storage method, in terms of storing a texture subsample and a geometry subsample as a sample of the ISOBMFF without using a concept of the PC sample as described above.

Therefore, elementary stream signaling in the third storage method has the same structure as that of the elementary stream (see FIG. 6) in the first storage method and the elementary stream (see FIG. 24) in the second storage method. However, in the third storage method, a sample in 1SOBMFF is defined as a geometry subsample and a texture subsample. Then, the geometry subsample defined as the sample in 1SOBMFF is referred to as a geometry sample, and the texture subsample defined as the sample in 1SOBMFF is referred to as a texture sample.

Figure 36:
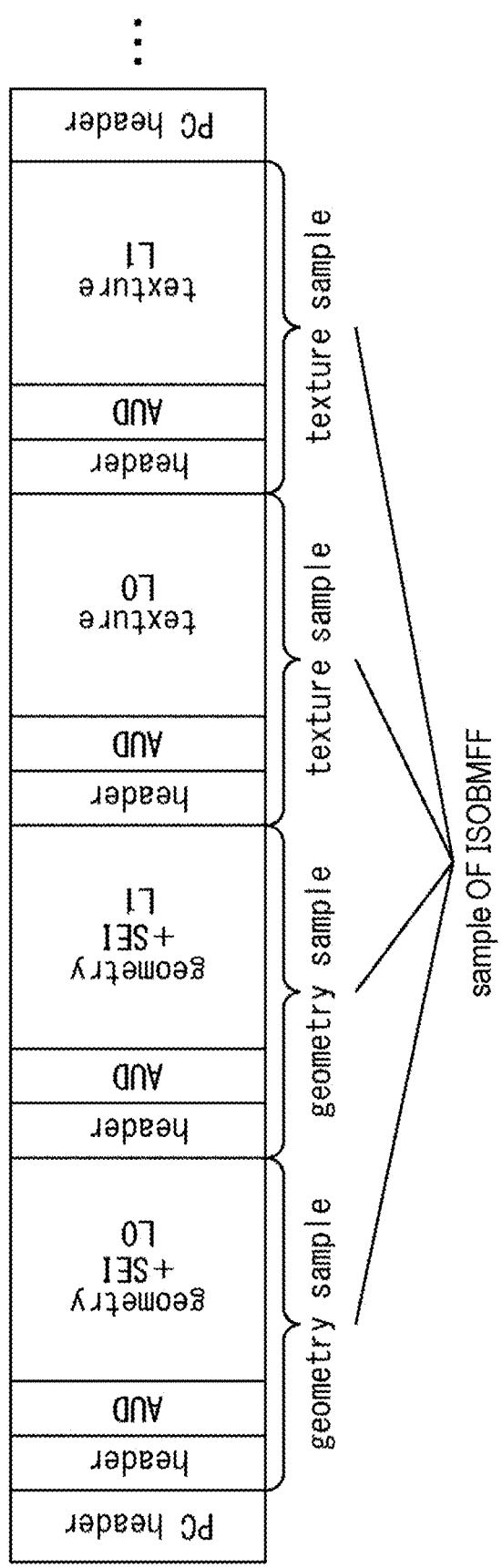
FIG. 36 is a view showing an example of elementary stream signaling.

FIG. 36 shows a structure similar to that of the elementary stream in the first storage method, as an example of elementary stream signaling in the third storage method.

Figure 37:
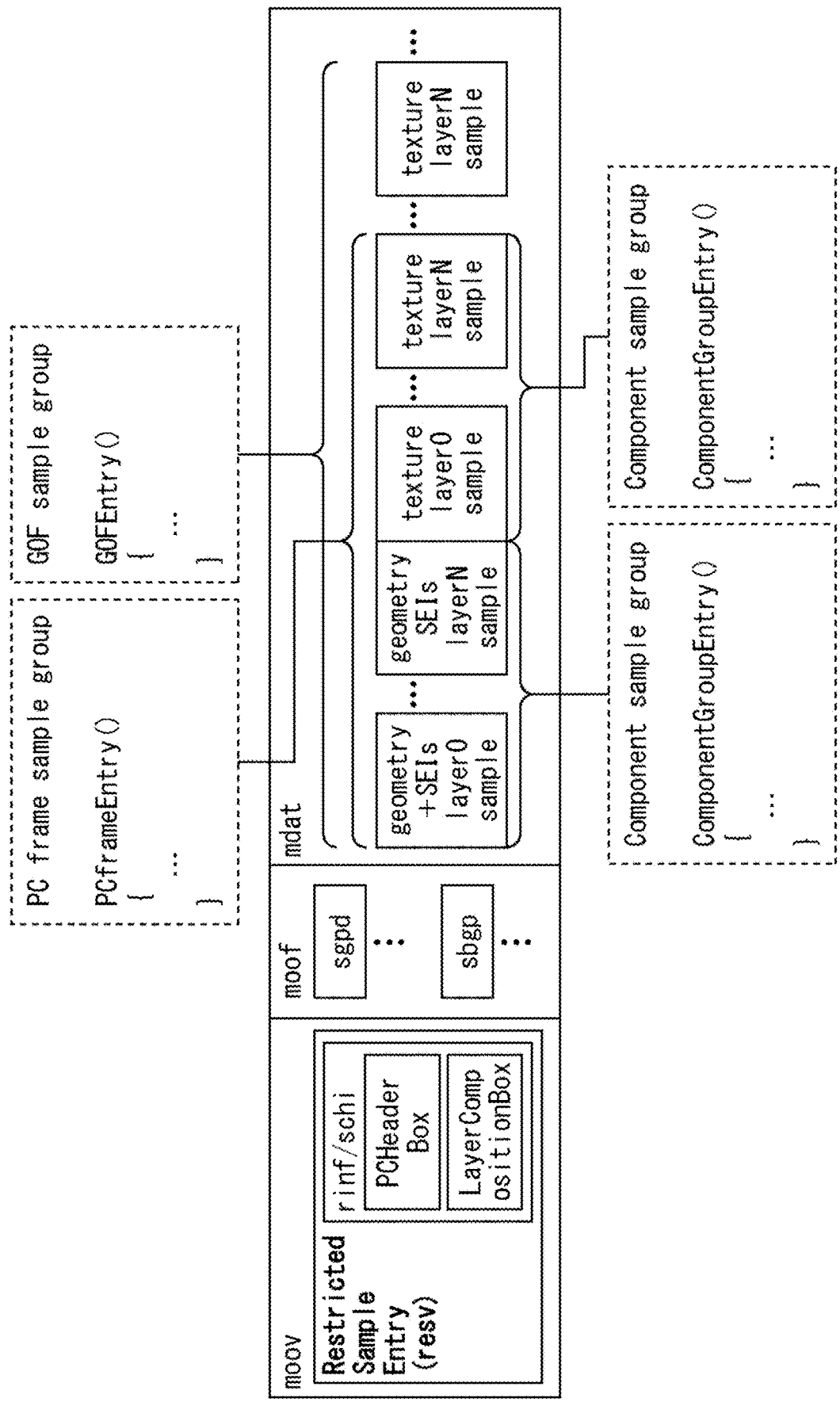
FIG. 37 is a view showing an example of ISOBMFF signaling.

FIG. 37 shows an example of ISOBMFF signaling.

For example, as shown in FIG. 37, a sample group can be used to signal a boundary of a Group of Frames (GOFEntry), a boundary of a PC frame (PCFrameEntry), a boundary of texture samples, a boundary of geometry samples, and a boundary of texture&geometry samples (ComponentGroupEntry). Note that the Sample Group will be described with reference to an outline of the Sample Group shown in FIG. 55 described later.

Then, each sample is associated with each SampleGroupEntry signaled by SampleGroupDescriptionBox ('sgpd') through SampleToGroupBox ('sbgp'). Note that sgpd may be signaled in SampleTableBox ('stbl') in MovieBox ('moov').

Here, FIGS. 38 to 40 show newly defined GroupEntry.

The GOFEntry is defined as shown in FIG. 38, and grouping_type_parameter='gofg' is set.

Note that semantics of each field of the GOFEntry is the same as that of each field of the GOF header shown in FIG. 9 described above.

The PCFrameEntry is defined as shown in FIG. 39, and grouping_type_parameter='pcfg' is set.

For example, a size_of_pc_frame field in the PCFrameEntry indicates a size of a PC frame. Furthermore, a number_of_component field indicates the number of components included in the PC frame, specifically, which is to be 2 in a case of including a geometry image and a texture image.

The ComponentGroupEntry is defined as shown in FIG. 40, and grouping_type_parameter='cmpg' is set.

For example, a type field in the ComponentGroupEntry indicates a type of a component of a sample belonging to this sample group. Specifically, it is indicated that the component type is a geometry image in a case where the type field is 0, while it is indicated that the component type is a texture image in a case where the type field is 1. Furthermore, in a case where the type field is 2, it is indicated that the type of the component is geometry&texture (the second storage method).

Note that, instead of signaling as SEI, in a case of treating, as one type of the component, three-dimensional information metadata such as an occupancy map or auxiliary patch info, a value indicating the type of each component may be added to the type field.

Furthermore, a number_of_layer field in the ComponentGroupEntry indicates the number of layers of the component.

Moreover, GeometryGroupEntry and TextureGroupEntry may be defined instead of the ComponentGroupEntry. Then, a boundary of geometry samples can be signaled by the GeometryGroupEntry, and a boundary of texture samples can be signaled by the TextureGroupEntry.

Furthermore, in a case of treating, as one type of the component, three-dimensional information metadata such as an occupancy map or auxiliary patch info and signaling as a sample instead of signaling as SEI, a GroupEntry that signals a boundary of individual samples may be defined. Then, a boundary of individual samples may be indicated by the GroupEntry.

Note that, in a case where each component and each layer are packed in one image as in the second storage method, the PCPackingInfoBox is signaled in the sample entry.

Here, in the third storage method, a stream stored in ISOBMFF can be made compliant with AVC, HEVC, SVC, SHEVC, and the like, and can be operated as a restricted scheme of these codecs, in that case. For example, a sample entry is to be 'resv', scheme_type of schemeTypeBox is to be 'pcbs', and data_format of OriginalFormatBox is to be avc1 or hev1 depending on the codec used.

Then, the plurality of newly defined Boxes is positioned to be used for post-decode processing, and is signaled under rinf/schi shown in FIG. 37. Moreover, PCHeaderBox and LayerCompositionBox described in the first storage method are also signaled in this rinf/schi as illustrated.

Furthermore, for example, in a case where each of the texture video stream and the geometry video stream is formed by two layers, a 120p video stream corresponds to a 30p PC stream.

Figure 41:
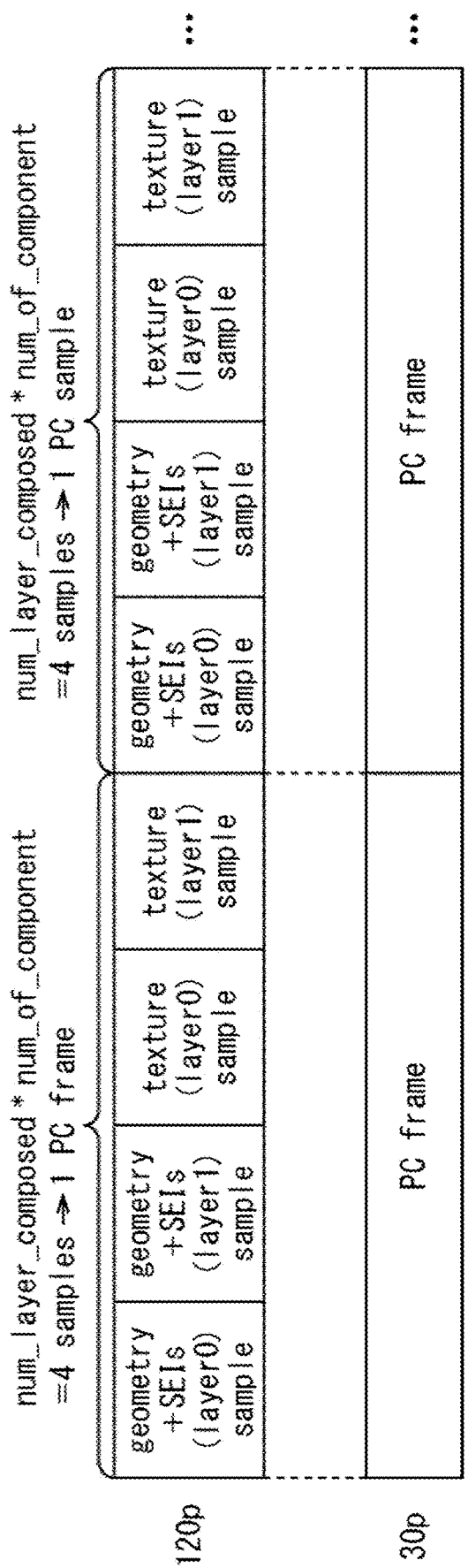
FIG. 41 is a view for explaining identification of an interleave cycle of a sample.

Therefore, as shown in FIG. 41, the client can identify four samples, which is an interleave cycle of the sample, from a value of (num_layer_composed*num_of_component of LayerCompositionBox).

Then, according to the signaling of these, without parsing a content of a sample, the client can identify a boundary of a Group of Frames, a boundary of a PC sample, and a boundary of a sample of each component, through information of the sample group. That is, the client can acquire information required for separating the texture image and the geometry image, from the PCPackingInfoBox.

Therefore, the client extracts a geometry video stream and a texture video stream and performs decode processing, with simplified processing of referring to only signaling of a system layer. Thereafter, the client can separate the geometry image and the texture image, and form a Point Cloud to execute rendering.

Here, in a case where packing is not applied as in the first storage method, the generation process and the playback process are performed in a similar manner as described above with reference to the flowcharts of FIGS. 19 and 20, respectively. At this time, in step S14 of FIG. 19, when the PC stream is stored in the ISOBMFF in which a Box containing the three-dimensional information metadata is signaled, the sample of the ISOBMFF becomes the sample of each component. Furthermore, in step S22 of FIG. 20, the geometry video stream and the texture video stream are individually decoded with two decoder instances.

Furthermore, in a case of applying packing as in the second storage method, the generation process and the playback process are performed in a similar manner as described above with reference to the flowcharts of FIGS. 32 and 33, respectively. At this time, in step S35 of FIG. 32, when the packed PC stream is stored in the ISOBMFF in which a Box containing the three-dimensional information metadata is signaled, the sample of the ISOBMFF is to be one picture of the packed PC stream. Furthermore, in step S42 of FIG. 33, the packed PC stream is decoded with one decoder instance.

Here, FIG. 42 shows an example of an ISOBMFF structure when a PC stream is stored in the ISOBMFF structure by the third storage method.

Note that, an example of signaling without using SEI will be described with reference to FIG. 43.

Up to this point, a description has been given to an example of signaling three-dimensional information metadata in a PC frame by using SEI. On the other hand, for example, the three-dimensional information metadata may be signaled by using sample auxiliary information defined by ISOBMFF.

Figure 43:
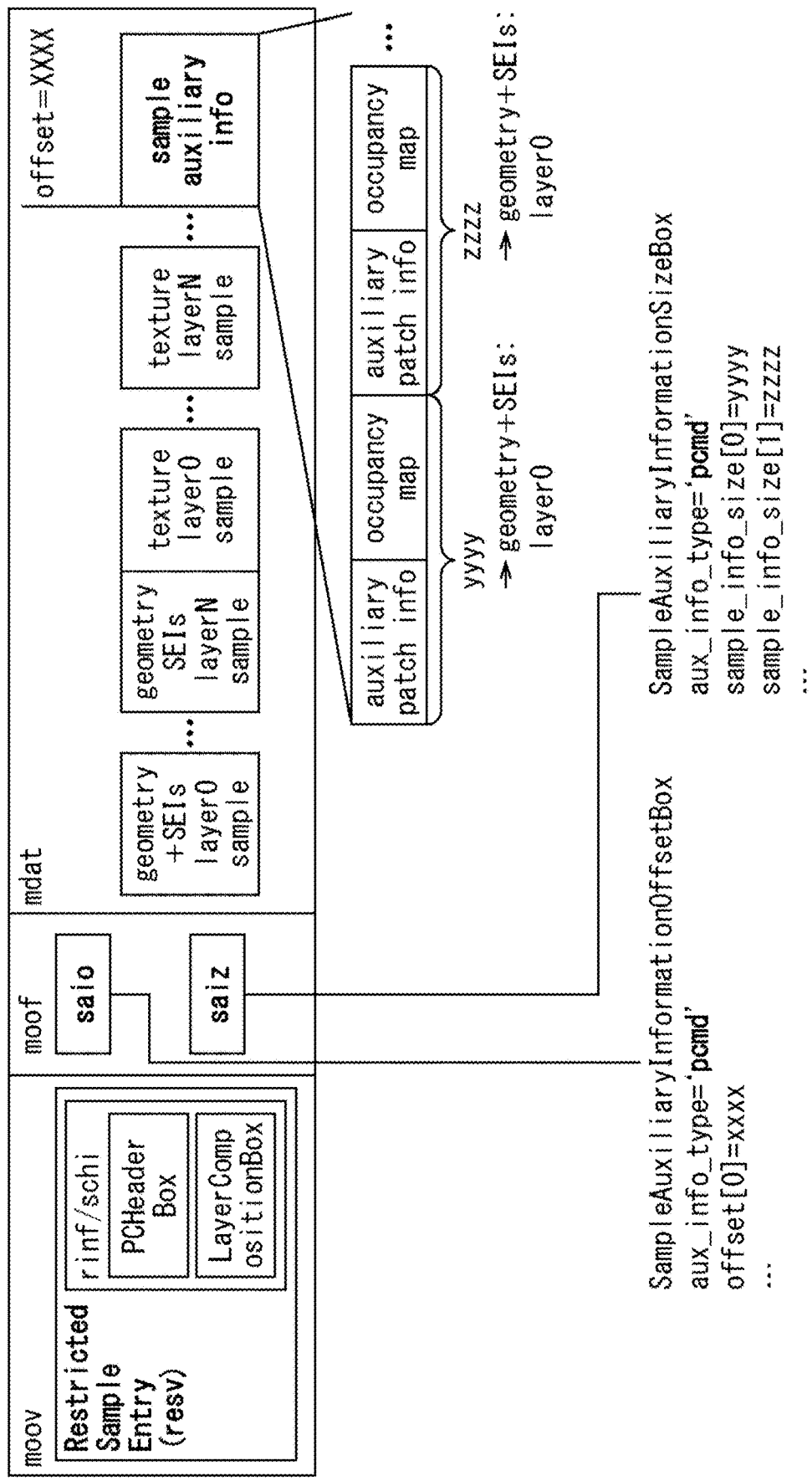
FIG. 43 is a view for explaining an example of signaling without using SEI.

That is, as shown in FIG. 43, a position of sample auxiliary information is signaled by an offset field of SampleAuxiliaryInformationOffsetBox ('saio'). Similarly, a size of the sample auxiliary information associated with each sample is signaled by a sample info size field of SampleAuxiliaryInformationSizeBox ('saiz'). For example, the SampleAuxiliaryInformationOffsetBox and the SampleAuxiliaryInformationSizeBox are linked by aux_info_type='pcmd'.

Since SEI is an element used in encoding codecs such as AVC and HEVC, signaling becomes codec-dependent in a case of using SEI. On the other hand, in a case of using the sample auxiliary information, it becomes possible to signal the three-dimensional information metadata without depending on the encoding codec.

<Fourth Storage Method>

With reference to FIGS. 44 to 53, a description is given to a fourth storage method, which is a method of dividing a PC stream into a geometry video stream and a texture video stream and storing in two tracks of ISOBMFF.

Figure 44:
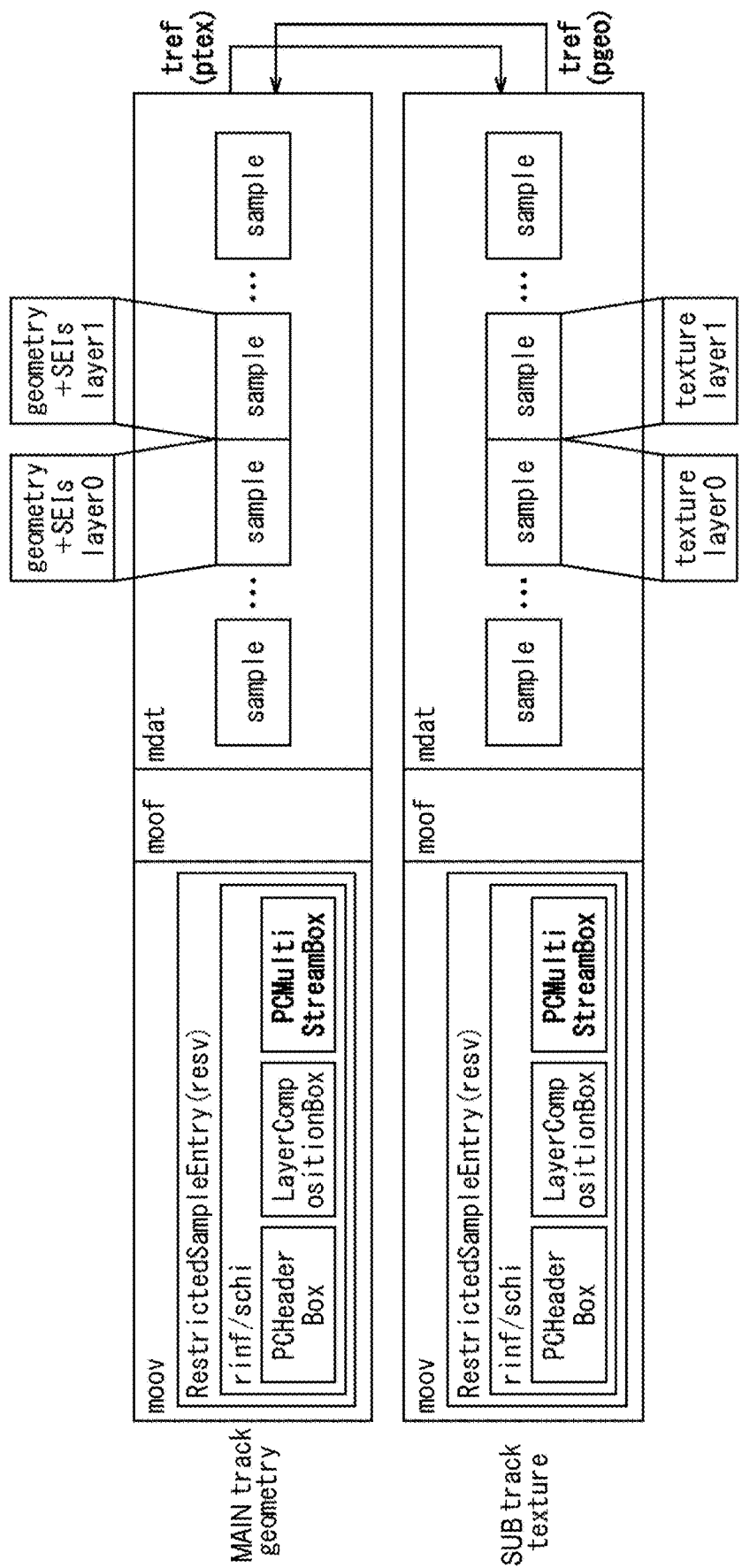
FIG. 44 is a view showing an example of ISOBMFF signaling.

FIG. 44 shows an example of ISOBMFF signaling in the fourth storage method.

As shown in FIG. 44, a PC stream is separated into a geometry video stream and a texture video stream, and each is stored in one track of ISOBMFF. Here, a track storing the geometry video stream is referred to as a geometry track (or a main track), and a track storing the texture video stream is referred to as a texture track (or a sub track). Furthermore, the geometry track also stores auxiliary patch info and an occupancy map.

Then, a relationship between the geometry track and the texture track is signaled by a track reference and newly defined PCMultiStreamBox.

Note that, in the fourth storage method as well, a Group of Frames and a sample group indicating a boundary of the PC frame may be signaled, similarly to the third storage method.

Furthermore, similarly to the modified example of the first storage method, a configuration may be adopted in which one layer is stored in one track of ISOBMFF. Here, for example, in order to indicate whether the layer stored in each track is layer 0 or layer 1, a layer identifier (for example, layer_id in FIG. 8) signaled by the header in the PC sample may be signaled by the sample entry of each track. Alternatively, the header itself in the PC sample may be stored in the sample entry of each track.

Here, in the fourth storage method, a stream stored in the ISOBMFF can be made compliant with AVC, HEVC, SVC, SHEVC, and the like, and can be operated as a restricted scheme of these codecs, in that case. For example, a sample entry is to be 'resv', scheme_type of schemeTypeBox is to be 'pcbs', and data_format of OriginalFormatBox is to be avc1 or hev1 depending on the codec used.

Then, the plurality of newly defined Boxes is positioned to be used for post-decode processing, and is signaled under rinf/schi shown in FIG. 44. Moreover, PCHeaderBox and LayerCompositionBox described in the first storage method are also signaled in this rinf/schi as illustrated.

Note that, instead of signaling as SEI, in a case of using, as one type of the component, three-dimensional information metadata such as an occupancy map or auxiliary patch info, the three-dimensional metadata may be stored in one track of ISOBMFF. In this case, a Box and information similar to those of the geometry track and texture track may be signaled in the sample entry of the track that stores the three-dimensional metadata.

Furthermore, for example, in a case where each of the texture video stream and the geometry video stream is formed by two layers and stored in individual tracks, each 60p video stream corresponds to a 30p PC stream. Therefore, the client can identify an interleave cycle of the sample, from a value of (num_layer_composed*num_of_component of LayerCompositionBox).

Note that a methodology in the fourth storage method can be applied not only to the above-described third storage method, but also to a configuration of packing different layers of the same component in the first storage method and the second storage method. In particular, as described with reference to B in FIG. 23 in the second storage method, in the methodology of packing of images of different layers of the same components into one image, it is possible to avoid deterioration of the compression efficiency when correlation between the texture image and the geometry image is small, by separating a geometry video stream and a texture video stream and storing in a track.

Moreover, a configuration may be adopted in which, for example, multiple texture tracks having different bit rates are associated with one geometry track.

FIG. 45 shows an example of syntax of PCMultiStreamBox.

For example, in a case where isGeometryStream=1, it is indicated to be a geometry track, and otherwise it is indicated to be a texture track. Furthermore, in a case of the geometry track, track id of an associated texture track is signaled.

According to such signaling, since the track reference is indicated, the client can identify which track is a geometry track by simply parsing any TrackReferenceBox of any one track. Thereafter, the client can parse the PCMultiStreamBox of the geometry track and identify all relevant texture tracks. That is, the client can identify the entire configuration by parsing at most two tracks, and the processing can be simplified particularly in a case where multiple texture tracks are associated.

Here, as a modified example of the syntax of the PCMultiStreamBox, texture tracks with different bitrates may be collectively signaled by a track group, and may be associated with a texture track group by texture_track_group_id, as shown in FIG. 46.

In this case, for the track group, PCTextureTrackGroupBox is newly defined as shown in FIG. 47, and rack_group_type is 'pctg'.

Note that texture_track_id may be associated with track_group_id of the PCTextureTrackGroup.

Furthermore, as shown in FIG. 48, isInGeometryStream indicating whether or not texture is stored in the same track as geometry may be added to the PCMultiStreamBox. Therefore, even with the first to third storage methods, a Box can be made capable of signaling.

Figure 49:
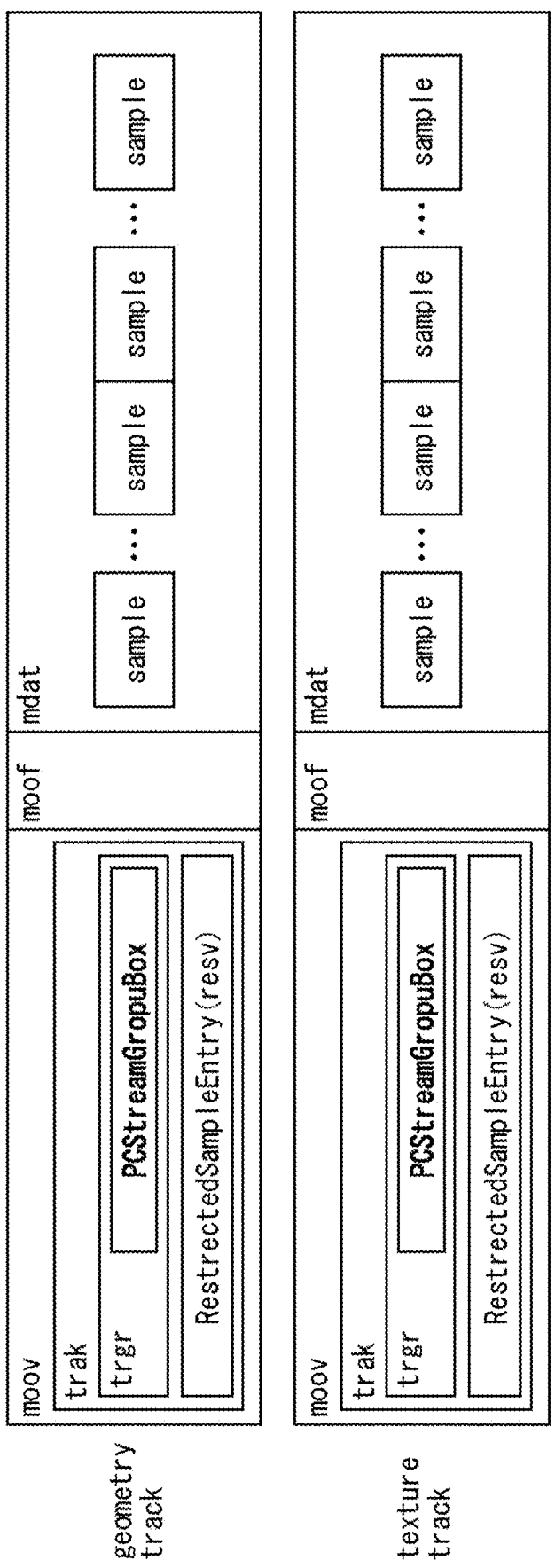
FIG. 49 is a view showing an example of signaling a geometry track and a texture track associated by a track group.

Moreover, instead of the PCMultiStreamBox, as shown in FIG. 49, a geometry track and a texture track associated by a track group may be signaled.

Then, as shown in FIG. 50, for the track group, PCStreamGroupBox is newly defined, and rack_group_type is 'pcgp'. At this time, tracks having pcgp with the same track_group_id form one PC stream. For example, isGeometry=0 indicates that the track is a texture track, and isGeometry=1 indicates that the track is a geometry track.

Here, FIG. 51 shows an example of an ISOBMFF structure when a PC stream is stored in the ISOBMFF structure by the fourth storage method.

<DASH Signaling>

With reference to FIGS. 52 and 53, DASH signaling will be described.

For example, a texture image, a geometry image, and three-dimensional information metadata are signaled by MPD of DASH. Then, as shown in FIG. 52, SupplementalProperty or EssentialProperty@schemeIdUri=="urn:mpeg:mpegI:pointcloud" is defined as a PC Component Descriptor, to indicate whether Representation is a texture image or a geometry image.

Furthermore, as shown in FIG. 52, association from texture representation to geometry representation is performed with Representation@dependencyId. This is because, at a time of presentation, there is a dependency relationship that a texture image cannot be mapped without a geometry image and three-dimensional information metadata.

According to the signaling of these, the client can refer to the PC Component Descriptor when acquiring a DASH distribution content, to appropriately acquire a geometry video stream and a texture video stream included in a PC stream. Furthermore, it is also possible to switch the texture video stream appropriately in accordance with a network bandwidth.

Note that the association from the geometry representation to the texture representation may be performed with Representation@associationId.

In this case, as shown in FIG. 53, associationType is to be "ptex". Since geometry alone enables presentation of a point cloud without color, association using the associationId is suitable.

In addition, in the first to fourth storage methods described above, a texture subsample and a geometry subsample other than layer 0, or a texture sample and a geometry subsample other than layer 0 all may be stored as a subsample of layer 0 or SEI of a sample.

Figure 54:
FIG. 54 is a view showing an outline of SubSampleInformationBox.

Here, FIG. 54 shows an outline of the SubSampleInformationBox.

As shown in FIG. 54, continuous specific byte regions in a sample is defined as sub-samples. Furthermore, a definition of the sub-sample is determined for every encoding codec. For example, an NAL unit is a sub-sample in HEVC. Furthermore, in the SubSampleInformationBox, information can be added for every sub-sample.

Figure 55:
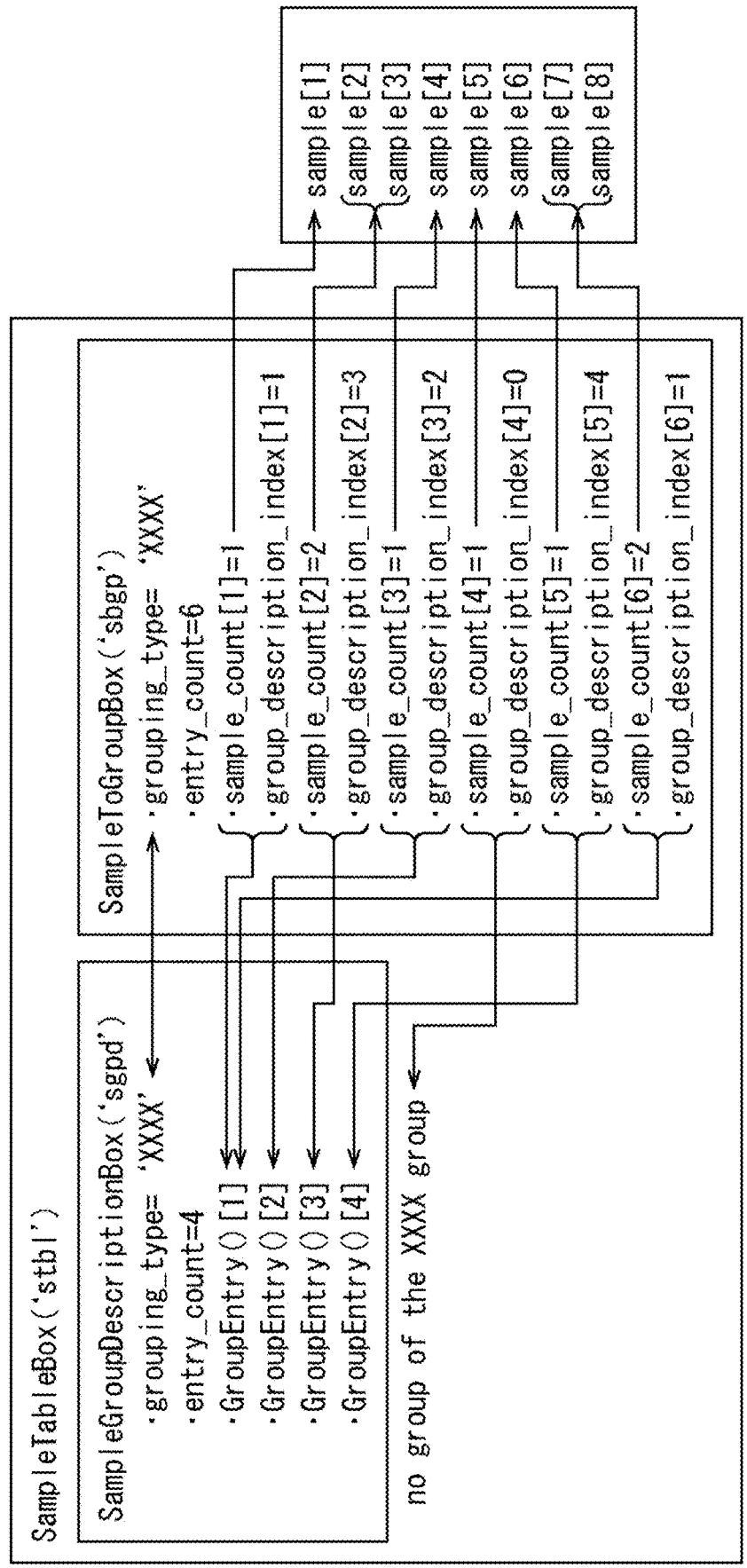
FIG. 55 is a view showing an outline of a Sample Group.

Furthermore, FIG. 55 shows an outline of a Sample Group.

As shown in FIG. 55, grouping_type of Sample To Group Box indicates grouping_type of associated Sample Group Description Box. For one entry, sample count and group_description_index are signaled. Then, the group_description_index indicates an index of an associated Group Entry, and the sample_count indicates the number of samples belonging to the Group Entry.

<System Configuration>

Figure 56:
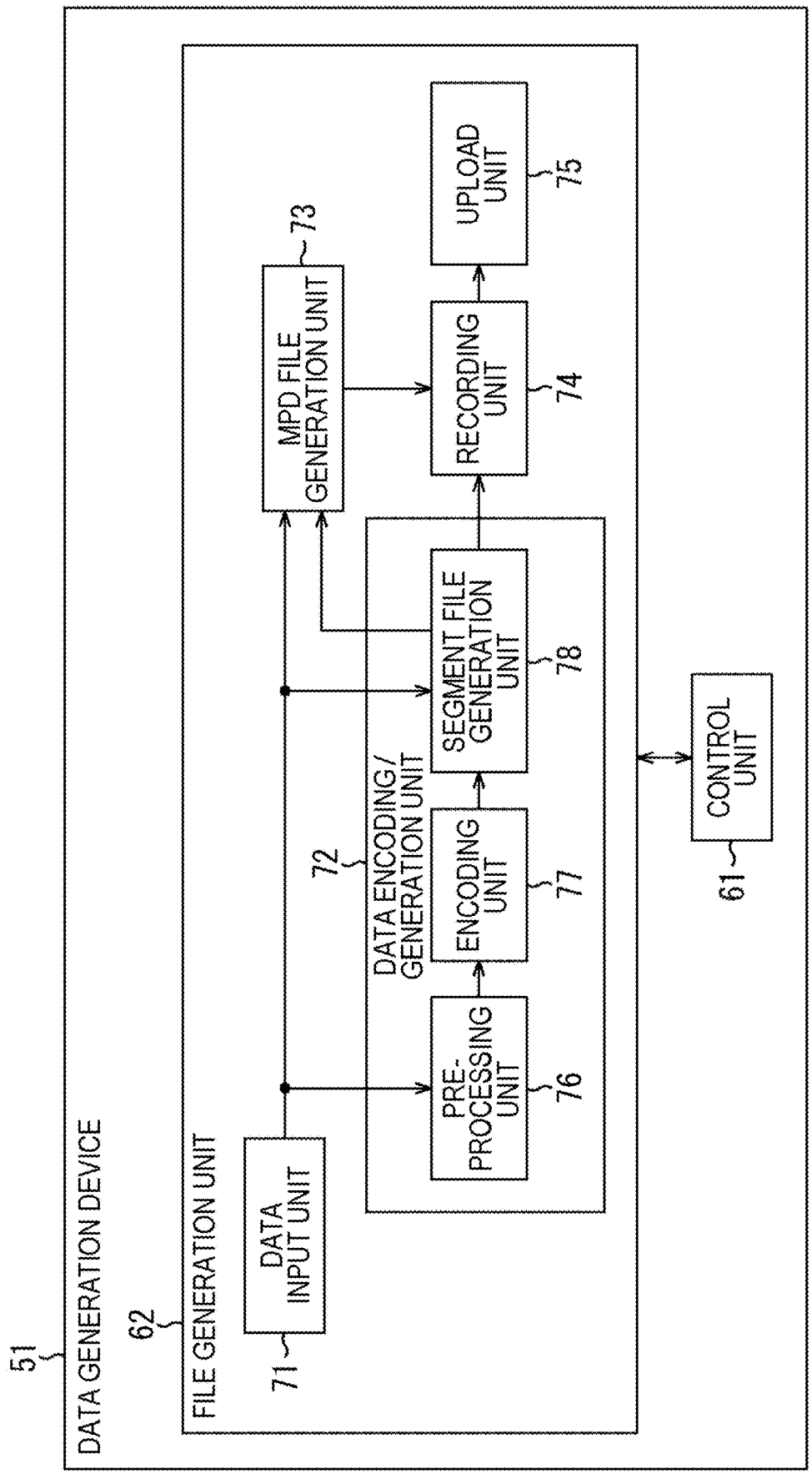
FIG. 56 is a block diagram showing a configuration example of a data generation device.
Figure 57:
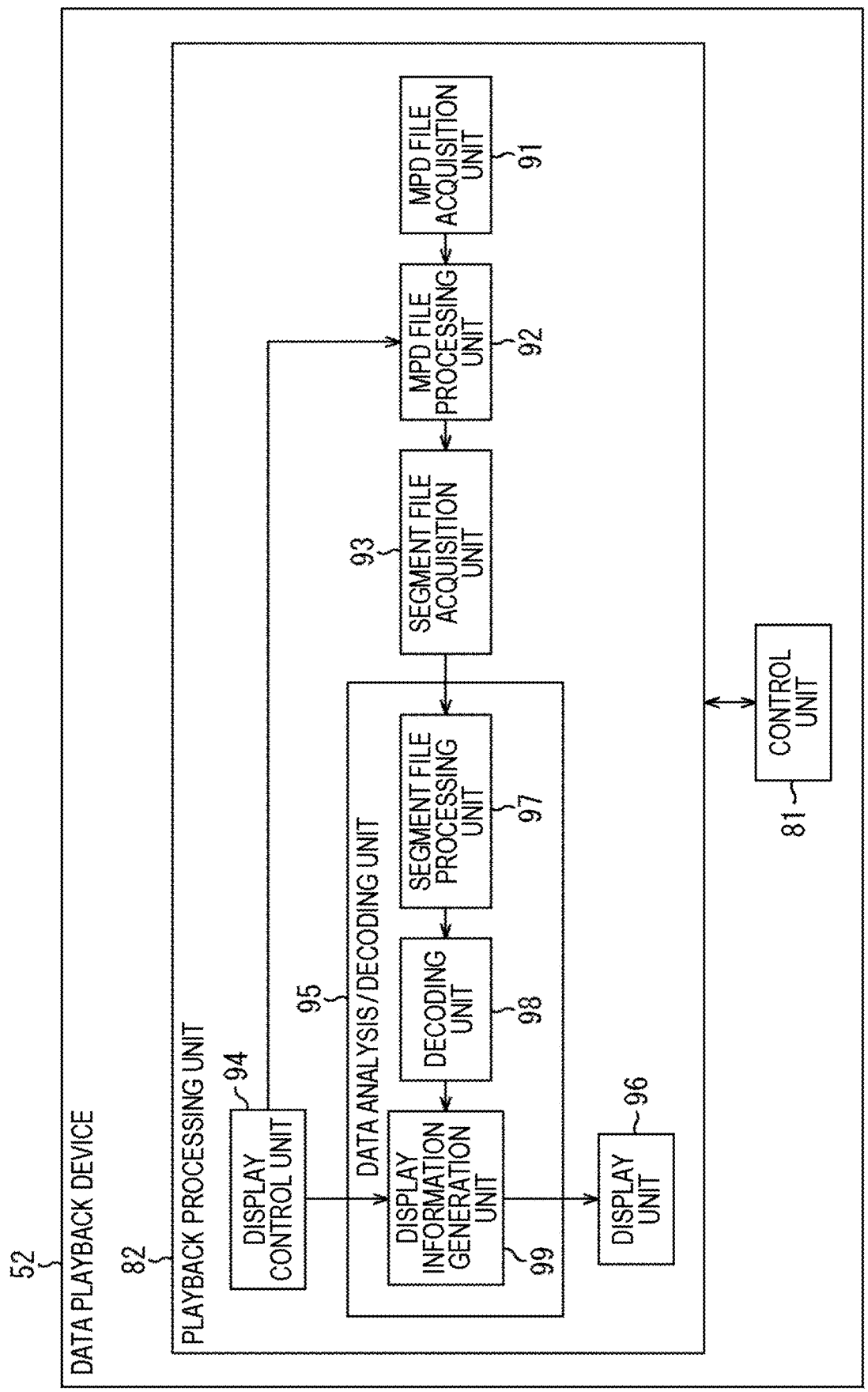
FIG. 57 is a block diagram showing a configuration example of a data playback device.

With reference to FIGS. 56 and 57, a description is given to a system configuration of a data generation device and a data playback device to which the present technology is applied.

FIG. 56 shows a block diagram showing a configuration example of the data generation device.

As shown in FIG. 56, a data generation device 51 includes a control unit 61 and a file generation unit 62. The file generation unit 62 includes a data input unit 71, a data encoding/generation unit 72, a media presentation description (MPD) file generation unit 73, a recording unit 74, and an upload unit 75. Then, the data encoding/generation unit 72 includes a pre-processing unit 76, an encoding unit 77, and a segment file generation unit 78.

For example, the pre-processing unit 76 corresponds to the 3D2D conversion unit 21 described above (FIG. 17 or 30), and executes a process of generating a geometry image, a texture image, and three-dimensional information metadata from an inputted Point Cloud.

Furthermore, the encoding unit 77 corresponds to the encoding unit 22 described above (FIG. 17), and executes a process of encoding a geometry video stream and a texture video stream. Alternatively, the encoding unit 77 corresponds to the encoding unit 22A described above (FIG. 30) and executes a process of encoding a packed PC image.

Furthermore, the segment file generation unit 78 corresponds to the PC stream generation unit 23 and the file generation unit 24 described above (FIG. 17 or 30), and executes a process of generating a PC stream and generating a PC file in which the PC stream is stored in ISOBMFF.

FIG. 57 shows a block diagram showing a configuration example of the data playback device.

As shown in FIG. 57, a data playback device 52 includes a control unit 81 and a playback processing unit 82. The playback processing unit 82 includes an MPD file acquisition unit 91, an MPD file processing unit 92, a segment file acquisition unit 93, a display control unit 94, a data analysis/decoding unit 95, and a display unit 96. Then, the data analysis/decoding unit 95 includes a segment file processing unit 97, a decoding unit 98, and a display information generation unit 99.

For example, the segment file processing unit 97 corresponds to the extraction unit 31 described above (FIG. 18), and executes a process of extracting a geometry video stream and a texture video stream corresponding to a playback time. Alternatively, the segment file processing unit 97 corresponds to the extraction unit 31 described above (FIG. 31), and executes a process of extracting a packed PC stream corresponding to a playback time.

Furthermore, the decoding unit 98 corresponds to the decoding unit 32 described above (FIG. 18), and executes a process of individually decoding each of a geometry video stream and a texture video stream. Alternatively, the decoding unit 98 corresponds to the decoding unit 32A described above (FIG. 31), and executes a process of decoding a packed PC stream.

Furthermore, the display information generation unit 99 corresponds to the 2D3D conversion unit 33 and the display processing unit 34 (FIG. 18 or FIG. 31), constructs a Point Cloud, renders the Point Cloud, and causes a display image to be displayed.

As described above, according to the present technology, it is possible to define a PC stream structure (a PC sample) suitable for ISOBMFF storage, and store a PC stream in one track of ISOBMFF. Therefore, at a time of playing back by the client, it is possible to execute decode processing of the PC stream and suppress an occurrence of random access in the stream during normal playback, with simplified processing of referring to only signaling of a system layer.

Furthermore, as in the third storage method, by storing a PC stream in one track of ISOBMFF without using a definition of the PC sample, it is similarly possible to execute decode processing of the PC stream by the simplified processing.

Moreover, as in the second storage method, a geometry video stream and a texture video stream of a PC stream can be packed into one stream and stored in one track of ISOBMFF. Therefore, it is possible to enable decode processing of the PC stream to be executed with one decoder instance during playback by the client.

Furthermore, as in the fourth storage method, a PC stream can be divided into a geometry video stream and a texture video stream, and stored in two tracks of ISOBMFF. Therefore, a track storing the geometry video stream and a track storing the texture video stream can be efficiently associated. Therefore, stream acquisition processing by the client for optimizing PC stream image quality according to a network band can be easily performed.

<Computer Configuration Example>

Next, the series of processes (an information processing method) described above can be performed by hardware or also performed by software. In a case where the series of processes is performed by software, a program that forms the software is installed in a general-purpose computer and the like.

Figure 58:
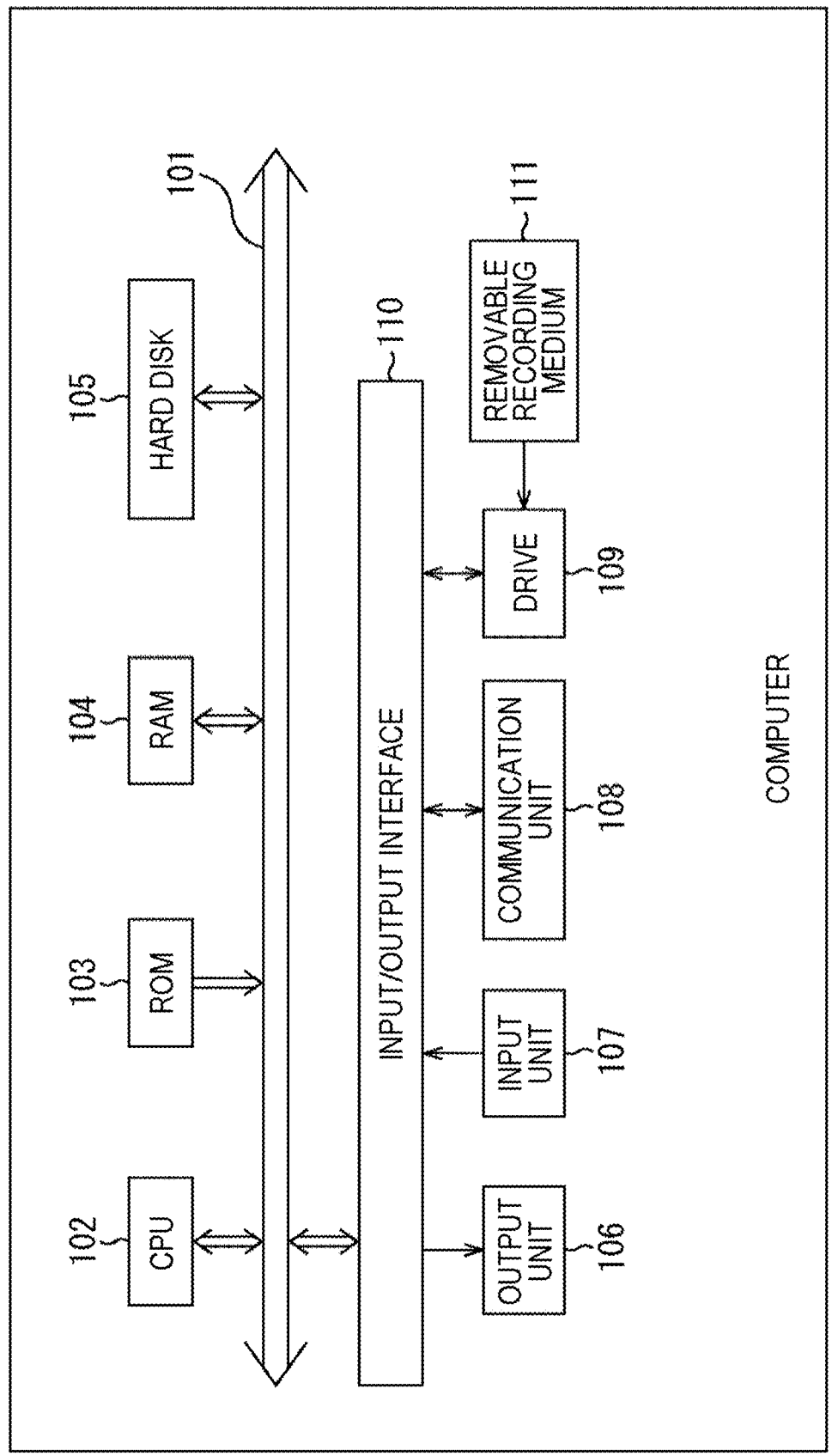
FIG. 58 is a block diagram showing a configuration example of an embodiment of a computer to which the present technology is applied.

FIG. 58 is a block diagram showing a configuration example of an embodiment of a computer to be installed with a program for executing the series of processes described above.

The program can be recorded in advance on a hard disk 105 or a ROM 103 as a recording medium built in the computer.

Alternatively, the program can be stored (recorded) in a removable recording medium 111 driven by a drive 109. Such a removable recording medium 111 can be provided as so-called package software. Here, examples of the removable recording medium 111 include, for example, a flexible disk, a compact disc read only memory (CD-ROM), a magneto optical (MO) disk, a digital versatile disc (DVD), a magnetic disk, a semiconductor memory, and the like.

Note that the program can be installed in the computer from the removable recording medium 111 as described above, or can be downloaded to the computer via a communication network or a broadcast network and installed in the built-in hard disk 105. That is, for example, the program can be wirelessly transferred from a download site to the computer via an artificial satellite for digital satellite broadcasting, or can be transferred by wire to the computer via a network such as a local area network (LAN) and the Internet.

The computer incorporates a central processing unit (CPU) 102, and an input/output interface 110 is connected to the CPU 102 via a bus 101.

When a command is inputted by a user operating an input unit 107 or the like via the input/output interface 110, in response to this, the CPU 102 executes a program stored in the read only memory (ROM) 103. Alternatively, the CPU 102 loads a program stored in the hard disk 105 into a random access memory (RAM) 104 and executes the program.

Therefore, the CPU 102 performs the processing according to the above-described flowchart or the processing performed by the configuration of the above-described block diagram. Then, as necessary, the CPU 102 causes a processing result to be outputted from an output unit 106 or transmitted from a communication unit 108 via the input/output interface 110, for example, and further to be recorded on the hard disk 105, and the like.

Note that the input unit 107 includes a keyboard, a mouse, a microphone, and the like. Furthermore, the output unit 106 includes a liquid crystal display (LCD), a speaker, and the like.

Here, in this specification, the processing performed by the computer according to the program needs not necessarily be performed in chronological order with the order described as the flowchart. That is, the processing performed by the computer according to the program includes processing executed in parallel or individually (for example, parallel processing or processing by an object).

Furthermore, the program may be processed by one computer (processor), or may be distributed and processed by a plurality of computers. Moreover, the program may be transferred to a remote computer to be executed.

Moreover, in this specification, a system means a set of a plurality of constituent elements (devices, modules (parts), and the like), and it does not matter whether or not all constituent elements are in a same housing. Therefore, a plurality of devices housed in separate housings and connected via a network, and a single device with a plurality of modules housed in one housing are both systems.

Furthermore, for example, a configuration described as one device (or processing unit) may be divided and configured as a plurality of devices (or processing units). On the contrary, a configuration described above as a plurality of devices (or processing units) may be collectively configured as one device (or processing unit). Furthermore, as a matter of course, a configuration other than the above may be added to a configuration of each device (or each processing unit). Moreover, as long as a configuration and an operation of the entire system are substantially the same, a part of a configuration of one device (or processing unit) may be included in a configuration of another device (or another processing unit).

Furthermore, for example, the present technology can have a cloud computing configuration in which one function is shared and processed in cooperation by a plurality of devices via a network.

Furthermore, for example, the above-mentioned program can be executed in any device. In that case, the device is only required to have a necessary function (a functional block or the like) such that necessary information can be obtained.

Furthermore, for example, each step described in the above-described flowchart can be executed by one device, and also shared and executed by a plurality of devices. Moreover, in a case where one step includes a plurality of processes, the plurality of processes included in the one step can be executed by one device, and also shared and executed by a plurality of devices. In other words, a plurality of processes included in one step can be executed as a plurality of steps. On the contrary, a process described as a plurality of steps can be collectively executed as one step.

Note that, in the program executed by the computer, processing of steps describing the program may be executed in chronological order in the order described in this specification, or may be executed in parallel or individually at a required timing such as when a call is made. That is, as long as no contradiction occurs, processing of each step may be executed in an order different from the order described above. Moreover, this processing of steps describing program may be executed in parallel with processing of another program, or may be executed in combination with processing of another program.

Note that the plurality of the present technologies described in this specification can be implemented independently as a single unit as long as no contradiction occurs. Of course, any of the plurality of present technologies can be used in combination. For example, a part or all of the present technology described in any embodiment can be implemented in combination with a part or all of the present technology described in another embodiment. Furthermore, a part or all of the present technology described above may be implemented in combination with another technology not described above.

<Combination Example of Configuration>

Note that the present technology can also have the following configurations.

(1)

An information processing apparatus in which by converting 3D data representing a three-dimensional structure into two dimensions, there are obtained at least a first image and a second image, and three-dimensional information metadata required for constructing the first image and the second image in three dimensions, the information processing apparatus including: a file generation unit configured to generate a file of one unit forming the 3D data displayed at a specific time, by storing the first image, the second image, and the three-dimensional information metadata in accordance with a playback order required at a time of reproducing and playing back the first image and the second image in three dimensions on the basis of the three-dimensional information metadata.

(2)

The information processing apparatus according to (1) described above, further including:

an encoding unit configured to encode the first image and the second image to generate a first image stream and a second image stream, in which after the first image stream and the second image stream are individually decoded, the file generation unit generates the file by storing the first image, the second image, and the three-dimensional information metadata in accordance with a decoding order required for reconstructing the first image and the second image as a three-dimensional structure on the basis of the three-dimensional information metadata.

(3)

The information processing apparatus according to (2) described above, in which the encoding unit encodes the first image and the second image by non-layered coding.

(4)

The information processing apparatus according to any one of (1) to (3) described above, in which the three-dimensional information metadata includes information indicating the first image and the second image.

(5)

The information processing apparatus according to any one of (1) to (4) described above, in which the three-dimensional information metadata includes information indicating a Group of Frames.

(6)

The information processing apparatus according to any one of (1) to (5) described above, in which the three-dimensional information metadata includes information indicating a number of layers and a number of components displayed at a same time.

(7)

The information processing apparatus according to any one of (1) to (6) described above, in which the three-dimensional information metadata includes codec information for every constituent element of the three-dimensional structure of the 3D data.

(8)

The information processing apparatus according to (2) described above, in which the encoding unit encodes the first image and the second image by layered coding.

(9)

The information processing apparatus according to any one of (1) to (8) described above, further including:

a packing processing unit configured to perform packing of multiple images into one packed image, in which the file generation unit stores, in the file, the packed image, the three-dimensional information metadata, and packing information indicating a method of the packing.

(10)

The information processing apparatus according to (9) described above, in which the packing processing unit performs packing of the first images of a same layer and the second images of a same layer.

(11)

The information processing apparatus according to (9) described above, in which the packing processing unit performs packing of same layers of the first image and the second image.

(12)

The information processing apparatus according to (9) described above, in which the packing processing unit performs packing of all layers of the first image and the second image.

(13)

The information processing apparatus according to any one of (1) to (12) described above, in which the file generation unit generates the file by storing a stream containing at least the first image, the second image, and the three-dimensional information metadata, as one sample of ISO base media file format (ISOBMFF).

(14)

The information processing apparatus according to (13) described above, in which any one of the first image and the second image includes the three-dimensional information metadata, and each of the first image and the second image is stored as the one sample.

(15)

The information processing apparatus according to any one of (1) to (14) described above, in which the file generation unit generates the file by storing a stream containing at least the first image, the second image, and the three-dimensional information metadata in different tracks.

(16)

The information processing apparatus according to (15) described above, in which the three-dimensional information metadata includes information indicating a relationship between the tracks.

(17)

The information processing apparatus according to any one of (1) to (16) described above, in which the first image, the second image, and the three-dimensional information metadata are signaled by the ISOBMFF.

(18)

The information processing apparatus according to any one of (1) to (16) described above, in which the first image, the second image, and the three-dimensional information metadata are signaled by a media presentation description (MPD) of dynamic adaptive st reaming over HTTP (DASH).

(19)

An information processing method in which, in an information processing apparatus, by converting 3D data representing a three-dimensional structure into two dimensions, there are obtained at least a first image and a second image, and three-dimensional information metadata required for constructing the first image and the second image in three dimensions, the information processing method including: generating a file of one unit forming the 3D data displayed at a specific time, by storing the first image, the second image, and the three-dimensional information metadata in accordance with a playback order required at a time of reproducing and playing back the first image and the second image in three dimensions on the basis of the three-dimensional information metadata.

(20)

A program for causing a computer of an information processing apparatus to execute information processing in which, by converting 3D data representing a three-dimensional structure into two dimensions, there are obtained at least a first image and a second image, and three-dimensional information metadata required for constructing the first image and the second image in three dimensions, the information processing including: generating a file of one unit forming the 3D data displayed at a specific time, by storing the first image, the second image, and the three-dimensional information metadata in accordance with a playback order required at a time of reproducing and playing back the first image and the second image in three dimensions on the basis of the three-dimensional information metadata.

Note that the present embodiment is not limited to the above-described embodiment, and various modified examples can be made without departing from the scope of the present disclosure. Furthermore, the effects described in this specification are merely examples and are not limited, and other effects may be present.

REFERENCE SIGNS LIST 11 and 12 Information processing apparatus
21 3D2D conversion unit
22 Encoding unit
23 PC stream generation unit
24 File generation unit
31 Extraction unit
32 Decoding unit
33 2D3D conversion unit
34 Display processing unit
51 Data generation device
52 Data playback device
61 Control unit
62 File generation unit
71 Data input unit
72 Data encoding/generation unit
73 MPD file generation unit
74 Recording unit
75 Upload unit
76 Pre-processing unit
77 Encoding unit
78 Segment file generation unit
81 Control unit
82 Playback processing unit
91 MPD file acquisition unit
92 MPD file processing unit
93 Segment file acquisition unit
94 Display control unit
95 Data analysis/decoding unit
96 Display unit
97 Segment file processing unit
98 Decoding unit
99 Display information generation unit

The invention claimed is:

1. An information processing apparatus comprising:
processing circuitry configured to process multiple Samples and corresponding three-dimensional information metadata for a Point Cloud (PC) at a specific time,
the multiple Samples include a Sample of a Geometry image and a Sample of a Texture image,
the three-dimensional information metadata includes a PC header that is header information of the multiple Samples, and the three-dimensional information metadata are obtained by converting 3D data corresponding to the Point Cloud into two dimensions,
wherein the PC header includes information regarding a number of Layers that is a number of Samples of the Geometry image or a number of Samples of the Texture image, included in a Point Cloud displayed at a specific time, and
the processing circuitry is configured to:
generate a file which has the Sample of the Geometry image, the Sample of the Texture image, and the three-dimensional information metadata, and
store the file for access by a data reproduction device,
wherein the three-dimensional information metadata further includes a sample-specific header, the sample-specific header including:
Type information indicating whether a corresponding sample is the Sample of the Geometry image or the Sample of the Texture image; and
a Layer identifier indicating a Layer corresponding to the sample.

2. The information processing apparatus according to claim 1, wherein
the file comprises an ISO base media file format (ISOBMFF), and
the information regarding the number of Layers is set in a moov Box that is a metadata region of the file.

3. The information processing apparatus according to claim 2, wherein the information regarding the number of Layers is set in a Sample Entry of the moov Box.

4. The information processing apparatus according to claim 3, wherein the Layer identifier is set into the Sample Entry.

5. The information processing apparatus according to claim 1, wherein when the Type information is 0, the corresponding sample is the Sample of the Geometry image, and when the Type information is 1, the corresponding sample is the Sample of the Texture image.

6. The information processing apparatus according to claim 5, wherein the Type information is signaled as SubSampleInformation.

7. The information processing apparatus according to claim 5, wherein the Type information is signaled in SubSampleEntryBox.

8. The information processing apparatus according to claim 1, wherein the three-dimensional information metadata includes information indicating a relationship between the multiple Samples.

9. The information processing apparatus according to claim 1, wherein the geometry image, the texture image, and the three-dimensional information metadata are signaled by an ISO base media file format (ISOBMFF).

10. The information processing apparatus according to claim 1, wherein the geometry image, the texture image, and the three-dimensional information metadata are signaled by a media presentation description (MPD) of dynamic adaptive streaming over HTTP (DASH).

11. An information processing method performed by a device, the method comprising:
  processing multiple Samples, and corresponding three-dimensional information on metadata for a Point Cloud (PC) at a specific time,
  the multiple Samples include a Sample of a Geometry image and a Sample of a Texture image,
  the three-dimensional information metadata includes a PC header that is header information of the multiple Samples, and the three-dimensional information metadata are obtained by converting 3D data corresponding to the Point Cloud into two dimensions,
  wherein the PC header includes information regarding a number of Layers that is a number of Samples of the Geometry image or a number of Samples of the Texture image, included in a Point Cloud displayed at a specific time,
  generating a file by storing the Sample of the Geometry image, the Sample of the Texture image, and the three-dimensional information metadata, and
  storing the file for access by a data reproduction device,
  wherein the three-dimensional information metadata further includes a sample-specific header, the sample-specific header including:
  Type information indicating whether a corresponding sample is the Sample of the Geometry image or the Sample of the Texture image; and
  a Layer identifier indicating a layer corresponding to the sample.

12. A non-transitory computer-readable product containing a program for causing a computer of an information processing apparatus to execute a method, the method comprising:
  processing multiple Samples and corresponding three-dimensional information metadata for a Point Cloud (PC) at a specific time,
  the multiple Samples include a Sample of a Geometry image and a Sample of a Texture image,
  the three-dimensional information metadata includes a PC header that is header information of the multiple Samples and the three-dimensional information metadata are obtained by converting 3D data corresponding to the Point Cloud into two dimensions,
  wherein the PC header includes information regarding a number of Layers that is a number of Samples of the Geometry image or a number of Samples of the Texture image, included in a Point Cloud displayed at a specific time,
  generating a file by storing the Sample of the Geometry image, the Sample of the Texture image, and the three-dimensional information metadata, and
  storing the file for access by a data reproduction device,
  wherein the three-dimensional information metadata further includes a sample-specific header, the sample-specific header including:
  Type information indicating whether a corresponding sample is the Sample of the Geometry image or the Sample of the Texture image; and
  a Layer identifier indicating a layer corresponding to the sample.

13. An information processing apparatus comprising:
  processing circuitry configured to regenerate a 3D image by accessing and decoding a file,
  wherein the file is created by a data generation device by:
  processing multiple Samples, and corresponding three-dimensional information metadata for a Point Cloud (PC) at a specific time,
  the multiple Samples include a Sample of a Geometry image and a Sample of a Texture image,
  the three-dimensional information metadata includes a PC header that is header information of the multiple Samples, and the three-dimensional information metadata are obtained by converting 3D data corresponding to the Point Cloud into two dimensions,
  wherein the PC header includes information regarding a number of Layers that is a number of Samples of the Geometry image or a number of Samples of the Texture image, included in a Point Cloud displayed at a specific time,
  generating the file by storing the Sample of the Geometry image, the Sample of the Texture image, and the three-dimensional information metadata, and
  storing the file for access,
  wherein the three-dimensional information metadata further includes a sample-specific header, the sample-specific header including:
  Type information indicating whether a corresponding sample is the Sample of the Geometry image or the Sample of the Texture image; and
  a Layer identifier indicating a Layer corresponding to the sample.

* * * * *